United States Patent
Mutz et al.

(10) Patent No.: US 12,459,902 B2
(45) Date of Patent: Nov. 4, 2025

(54) CRYSTALLINE FORMS OF 4-(7-HYDROXY-2-ISOPROPYL-4-OXO-4H-QUINAZOLIN-3-YL)-BENZONITRILE AND FORMULATIONS THEREOF

(71) Applicant: Bausch + Lomb Ireland Limited, Dublin (IE)

(72) Inventors: Michael Mutz, Freiburg im Breisgau (DE); Fang Wang, Shanghai (CN); Mei Xia, Shanghai (CN)

(73) Assignee: Bausch + Lomb Ireland Limited, Dublin (IE)

( * ) Notice: Subject to any disclaimer, the term of this patent is extended or adjusted under 35 U.S.C. 154(b) by 459 days.

(21) Appl. No.: 18/040,552

(22) PCT Filed: Aug. 4, 2021

(86) PCT No.: PCT/IB2021/057165
§ 371 (c)(1),
(2) Date: Feb. 3, 2023

(87) PCT Pub. No.: WO2022/029656
PCT Pub. Date: Feb. 10, 2022

(65) Prior Publication Data
US 2023/0286924 A1 Sep. 14, 2023

(30) Foreign Application Priority Data

Aug. 6, 2020 (WO) ............... PCT/CN2020/107444

(51) Int. Cl.
*C07D 239/91* (2006.01)
*A61K 9/00* (2006.01)
*A61K 9/08* (2006.01)
*A61K 31/517* (2006.01)

(52) U.S. Cl.
CPC .......... *C07D 239/91* (2013.01); *A61K 9/0048* (2013.01); *A61K 9/08* (2013.01); *A61K 31/517* (2013.01); *C07B 2200/13* (2013.01)

(58) Field of Classification Search
CPC ...... C07D 239/91; A61K 9/0048; A61K 9/08; A61K 31/517; C07B 2200/13
USPC ...................................................... 514/266.3
See application file for complete search history.

(56) References Cited

U.S. PATENT DOCUMENTS 11,478,480 B2 * 10/2022 Bullock ................. A61K 47/10
12,290,517 B2 * 5/2025 Bullock ................. A61K 47/10

FOREIGN PATENT DOCUMENTS

| WO | 2007065662 A2 | 6/2007 |
| WO | 2010084050 A2 | 7/2010 |
| WO | 2020165840 A1 | 8/2020 |

OTHER PUBLICATIONS

Laird, Polymorphism—Still Unpredictable? Org. Process Res. Dev. 2010, 14, 1, 1 (Year: 2010).*

* cited by examiner

*Primary Examiner* — Andrew D Kosar
(74) *Attorney, Agent, or Firm* — Finnegan, Henderson, Farabow, Garrett & Dunner LLP

(57) ABSTRACT

The present disclosure provides polymorphs and formulations of 4-(7-hydroxy-2-isopropyl-4-oxo-4H-quinazolin-3-yl)-benzonitrile (compound I). The present disclosure further provides methods for treating ocular surface pain by administering 4-(7-hydroxy-2-isopropyl-4-oxo-4H-quinazolin-3-yl)-benzonitrile (compound I). The present invention also provides 5 methods for treating dry eye disease and ocular hyperemia by administering 4-(7-hydroxy-2-isopropyl-4-oxo-4H-quinazolin-3-yl)-benzonitrile.

20 Claims, 12 Drawing Sheets

CRYSTALLINE FORMS OF 4-(7-HYDROXY-2-ISOPROPYL-4-OXO-4H-QUINAZOLIN-3-YL)-BENZONITRILE AND FORMULATIONS THEREOF

FIELD

The present disclosure relates to crystalline forms of 4-(7-Hydroxy-2-isopropyl-4-oxo-4H-quinazolin-3-yl)-benzonitrile (Formula I) processes and methods for their manufacture. The invention also relates to formulations of compound I and methods for treating ocular surface disorders using same.

BACKGROUND

Patients suffering from ocular surface pain, particularly chronic ocular surface pain have a significant decline in quality of life, and many develop depression, moderate-to-severe angina, dialysis, disabling hip fracture and in some cases become suicidal. In many patients, the ocular surface pain remains unresolved despite treatment of the underlying pathology (e.g., recent trauma or surgery, infection, or inflammation) and other known treatments cannot be used for long term therapy.

The Transient Receptor Potential Vanilloid 1 (TRPV1) receptor is implicated in pain signaling and antagonism of this receptor may be helpful in symptoms of pain. It would be desirable to administer topically to the surface of the eye a formulation of a TRPV1 antagonist to alleviate pain, particularly chronic pain.

Formulating hydrophobic ophthalmic drugs can be particularly troublesome, because they are particularly prone to agglomeration within aqueous topical ophthalmic compositions. Agglomeration may cause stability and potentially other quality issues for the compositions, and may arise from other interactions of drugs and excipients. Accordingly, there is a need for identification of different polymorphic forms that may be formulated in ophthalmic formulations for delivery to the ocular surface.

SUMMARY

In some embodiments, the present invention relates to crystal form K' of 4-(7-Hydroxy-2-isopropyl-4-oxo-4H-quinazolin-3-yl)-benzonitrile (compound I) having structure

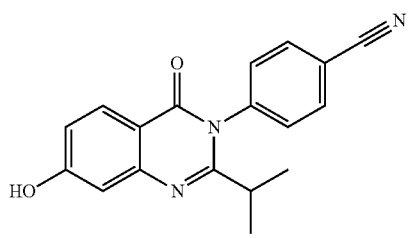 [SMILES: CC(C)c1nc2cc(O)ccc2c(=O)n1-c1ccc(C#N)cc1]

characterized by an X ray diffraction pattern having three or more peaks at 2θ values selected from 5.3, 12.3, and 22.5±0.2 °2θ. In some embodiments, crystal form K' of compound I is characterized by an X ray diffraction pattern having three or more peaks at 2θ values selected from 5.3, 10.6, 12.3, 21.2, 22.5, and 23.0±0.2 °2θ. In some embodiments, the present invention relates to a method of preparing a crystal form K' of compound I, comprising evaporating a solution of compound I in about 1:1 (v/v) n-butanol/dichloromethane, to crystallize compound I as crystal form K'.

In some embodiments, the present invention relates to crystal form M of 4-(7-Hydroxy-2-isopropyl-4-oxo-4H-quinazolin-3-yl)-benzonitrile (compound I) having structure

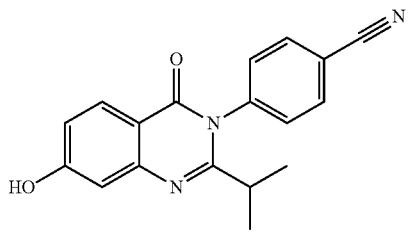 [SMILES: CC(C)c1nc2cc(O)ccc2c(=O)n1-c1ccc(C#N)cc1]

characterized by an X ray diffraction pattern having three or more peaks at 2θ values selected from 11.1, 18.5, 19.1±0.2 °2θ. In particular embodiments, crystal form M of compound I is characterized by an X ray diffraction pattern having three or more peaks at 2θ values selected from 11.1, 12.1, 18.5, 19.1, 20.1, 21.4±0.2 °2θ. In some embodiments, the invention relates to a method of preparing a crystal form M of compound I, comprising slurrying compound I in crystal form B in acetone at room temperature for at least 24 hours.

In some embodiments, the present invention relates to crystalline hydrate $H_B$ of 4-(7-Hydroxy-2-isopropyl-4-oxo-4H-quinazolin-3-yl)-benzonitrile (compound I) having structure

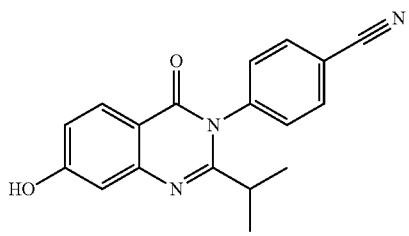 [SMILES: CC(C)c1nc2cc(O)ccc2c(=O)n1-c1ccc(C#N)cc1]

characterized by an X ray diffraction pattern having three or more peaks at 2θ values selected from _6.6, 12.2, 15.8±0.2 °2θ. In particular embodiments, the crystalline hydrate $H_B$ of compound I is characterized by an X ray diffraction pattern having three or more peaks at 2θ values selected from 6.6, _12.2, _14.6, 15.8, 16.1, 18.5, 20.9, 24.7_±0.2 °2θ. In some embodiments, the present invention relates to a method of preparing crystalline hydrate $H_B$ of compound I, comprising slurrying compound I in crystal form B in a about 1:1 mixture of acetone and water at room temperature for at least 5 days, at least 6 days, or at least 7 days, to provide compound I as crystalline hydrate $H_B$.

In some embodiments, the present invention relates to crystal form Q of 4-(7-Hydroxy-2-isopropyl-4-oxo-4H-quinazolin-3-yl)-benzonitrile (compound I) having structure

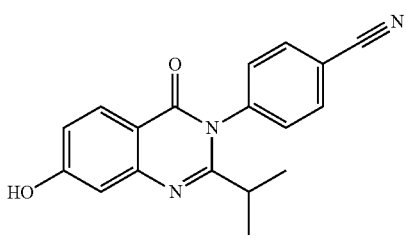 [SMILES: CC(C)c1nc2cc(O)ccc2c(=O)n1-c1ccc(C#N)cc1]

characterized by an X ray diffraction pattern having three or more peaks at 2θ values selected from 11.2, 12.2, 19.1±0.2 °2θ. In particular embodiments, crystal form Q of compound I is characterized by an X ray diffraction pattern having three or more peaks at 2θ values selected from 11.2, 12.2, 18.5, 19.1, 20.1, 22.0, 22.5, 23.3, 26.5±0.2 °2θ. In some embodiments, the present invention relates to a method of preparing a crystal form Q of compound I according to claims 10-11, comprising slurrying compound I in crystal form B in about 1:1 (v/v) n-butanol/dichloromethane at 50° C., to obtain compound I as crystal form Q.

In some embodiments, the present disclosure provides a pharmaceutical formulation, comprising a crystal form of compound I selected from the group consisting of: crystal form K', crystal form M, crystal form Q, Hydrate $H_B$, and combinations thereof, and a pharmaceutically acceptable excipient.

In some embodiments, the present disclosure provides a pharmaceutical formulation for ocular use (e.g., topical application to the ocular surface), comprising a crystal form of compound I selected from the group consisting of: crystal form K', crystal form M, crystal form Q, Hydrate $H_B$, and combinations thereof, and a pharmaceutically acceptable excipient.

In some embodiments, the disclosure provides a pharmaceutical formulation, comprising the crystal form K' in substantially pure form.

In some embodiments, the disclosure provides a pharmaceutical formulation, comprising the crystal form M in substantially pure form.

In some embodiments, the disclosure provides a pharmaceutical formulation, comprising the crystal form Q in substantially pure form.

In some embodiments, the disclosure provides a pharmaceutical formulation, comprising the Hydrate $H_B$ in substantially pure form.

In some embodiments, the disclosure provides a pharmaceutical formulation, comprising a mixture of mixture of crystal forms B and K', crystal forms B and M, crystal forms B and Q, crystal forms B and Hydrate $H_B$, in ratios of from about 1:99 to about 99:1.

In some embodiments, the pharmaceutical formulation, comprising any of the crystal forms disclosed herein is formulated for ocular use (e.g., topical application to the ocular surface).

In some embodiments, described herein is an aqueous formulation that includes:
4-(7-Hydroxy-2-isopropyl-4-oxo-4H-quinazolin-3-yl)-benzonitrile (compound I) or a salt, co-crystal, or polymorph thereof,
and one or more excipients selected from the group consisting of a surfactant, a suspending agent, a tonicity agent, a buffer, a preservative, a salt, and a preservative.

In some embodiments, the 4-(7-Hydroxy-2-isopropyl-4-oxo-4H-quinazolin-3-yl)-benzonitrile (compound I) is present in the formulation as a suspension in crystal form K', crystal form M, crystal form Q, Hydrate $H_B$, or combinations thereof. In alternative or additional embodiments, the 4-(7-Hydroxy-2-isopropyl-4-oxo-4H-quinazolin-3-yl)-benzonitrile (compound I) in crystal form K', crystal form M, crystal form Q, Hydrate $H_B$, or combinations thereof is present in the formulation in an amount of about 0.5% w/v to about 3.5% w/v.

In some embodiments, described herein is an aqueous formulation that includes:
4-(7-Hydroxy-2-isopropyl-4-oxo-4H-quinazolin-3-yl)-benzonitrile (compound I) in crystal form K', crystal form M, crystal form Q, Hydrate $H_B$, or combinations thereof, in an amount of about 0.5% w/v to about 3.5% w/v, present as a suspension in the formulation,
a surfactant,
a suspending agent,
and one or more excipients selected from the group consisting of a tonicity agent, a buffer, a preservative, a salt, and a preservative.

In some embodiments, the invention described herein is a formulation that includes:
a suspension of 4-(7-Hydroxy-2-isopropyl-4-oxo-4H-quinazolin-3-yl)-benzonitrile (compound I) in crystal form K', crystal form M, crystal form Q, Hydrate $H_B$, or combinations thereof, in an amount of about 0.5% w/v to about 3.5% w/v,
a non-ionic surfactant;
a suspending agent;
a tonicity agent;
a buffer;
a salt; and
optionally, a preservative.

In some embodiments, the present disclosure relates to a formulation, comprising:
a suspension of 4-(7-Hydroxy-2-isopropyl-4-oxo-4H-quinazolin-3-yl)-benzonitrile (compound I) in crystal form K', crystal form M, crystal form Q, Hydrate $H_B$, or combinations thereof, in an amount of about 0.5% w/v to about 3.5% w/v,
a surfactant selected from the group consisting of non-ionic, anionic, cationic surfactants, and combinations thereof;
a suspending agent;
a tonicity agent;
a buffer;
optionally, a salt;
optionally, a preservative; and
water in quantity sufficient (qs) to 100%.

In some embodiments, the formulation includes a non-ionic surfactant. In some embodiments of the formulations described herein, the non-ionic surfactant is selected from the group consisting of a polysorbate surfactant, a block copolymer of ethylene oxide, propylene oxide surfactant, poloxamer, tyloxapol, and combinations thereof.

In some embodiments of the formulations described herein, the non-ionic surfactant is tyloxapol, which is present in an amount of at least about 0.001% w/v, at least about 0.01% w/v, at least about 0.02% w/v, least about 0.03% w/v, or at least about 0.04% w/v, and no more than about 1% w/v, no more than about 0.5% w/v, no more than about 0.3% w/v, or no more than about 0.2% w/v, no more than about 0.1% w/v, or no more than about 0.08% w/v. In some embodiments, the tyloxapol is present in an amount of about 0.03% w/v to 0.08% w/v, or about 0.05% w/v.

In some embodiments of the formulations described herein, the non-ionic surfactant is poloxamer in an amount of about 15 to about 20% w/v of the formulation.

In some embodiments of the formulations described herein, the suspending agent is selected from the group consisting of carbomer, hydroxypropyl methyl cellulose (hypromellose), polyethylene glycol, and combinations thereof. In some embodiments, the suspending agent is carbomer, present in the formulation in an amount of at least about 0.05% w/v, at least about 0.1% w/v, or at least about 0.2% w/v, and no greater than about 1.0% w/v, no greater than about 0.6% w/v, or no greater than about 0.5%. In some embodiments, the carbomer is present in the formulation in an amount of 0.1% w/v to about 0.3% w/v, or about 0.2% w/v.

In some embodiments of the formulations described herein, the suspending agent is hydroxypropyl methyl cellulose present in the formulation in an amount of at least about 0.05% w/v, at least about 0.1% w/v, or at least about 0.25% w/v, and less than about 1.8% w/v, less than about 1.0% w/v, less than about 0.8% w/v, or less than about 0.6% w/v. In some embodiments, the suspending agent is a polyethylene glycol (PEG) having molecular weight of from about 200 to about 20,000 Da. In some embodiments, the suspending agent is PEG400, at a concentration of from about 4% w/v to about 9% w/v, about 5% w/v to about 8% w/v, or about 7% w/v, or PEG6000 at a concentration of from about 1% w/v to about 4% w/v, about 1% w/v to about 3% w/v, or about 2% w/v.

In some embodiments of the formulations described herein, the suspending agent is substantially all carbomer homopolymer Type B.

In some embodiments of the formulations described herein, the tonicity agent is selected from the group consisting of polyols.

In some embodiments of the formulations described herein, the polyol is selected from the group selected from mannitol, glycerin, xylitol, sorbitol and propylene glycol, and combinations thereof. In some embodiments, the polyol is present in an amount from about 0.05% w/v to about 10% w/v, from about 0.1% to about 8% w/v, from about 0.1% to about 7% w/v, from about 0.1% to about 5% w/v. In particular embodiments, the polyol is mannitol or glycerin, present in the formulation in an amount of from about 0.1% w/v to about 5% w/v, or about 0.2% w/v, about 0.3% w/v, about 0.4% w/v, about 0.5% w/v, about 1% w/v, about 2% w/v, about 2.5% w/v, about 3.0% w/v, about 3.5% w/v, about 4.0% w/v, about 4.5% w/v, or about 5% w/v.

In some embodiments of the formulations described herein, the buffer is selected from the group consisting of acetate, ascorbate, borate, hydrogen carbonate, carbonate, citrate, edetate (EDTA) gluconate, lactate, phosphate, propionate and TRIS (tromethamine). In particular embodiments, the buffer is phosphate or TRIS.

In some embodiments of the formulations described herein, the salt is sodium chloride or potassium chloride.

In some embodiments of the formulations described herein, the suspending agent is carbopol (carbomer homopolymer Type B) and amount of sodium chloride is adjusted to an amount to provide a viscosity of the formulation of about 20 cP to about 200 cP, when using spindle CP-42 at 60 rpm at about 25° C. In some embodiments, the sodium chloride is present in an amount from about 0.01% w/v to about 0.5% w/v, from about 0.02% w/v to about 0.4% w/v, from about 0.03% w/v to about 0.3% w/v, from about 0.04% w/v to about 0.2% w/v, from about 0.05% w/v to about 0.1% w/v, or about 0.05% w/v.

In some embodiments of the formulations described herein, the pH of the formulation is about 5.5 to about 8.0. In some embodiments, the pH of the formulation is from about 6.0 to about 8.0, about 6.0, or about 7.4.

In some embodiments the formulations described herein further include an additional agent selected from the group consisting of cyclodextrins in an amount of at least about 1.5 w/v %, at least about 3.0 w/v %, at least about 3.5 w/v % or at least about 4.5 w/v, but no greater than about 10.0 w/v %, no greater than about 8.0 w/v %, no greater than about 6.5 w/v %, or no greater than about 5.5 w/v %. In some embodiments, the cyclodextrin is hydroxypropyl β-cyclodextrin or sulfoalkylether β-cyclodextrin in an amount of about 5% w/v of the formulation.

In some embodiments, the present disclosure is related to a formulation, comprising:
  the compound I in crystal form K', crystal form M, crystal form Q, Hydrate $H_B$, or combinations thereof, in an amount of about 0.5% w/v to about 2.5% w/v,
  the a non-ionic surfactant is tyloxapol, poloxamer, or combinations thereof, in an amount of from about 0.01 to 0.2% w/v;
  the a suspending agent is hydroxypropyl methyl cellulose, polyethylene glycol or carbomer homopolymer Type B;
  the a tonicity agent is at least one polyol in an amount of from about 0.05% w/v to about 10% w/v;
  the buffer is edetate, phosphate, borate, or combinations thereof
  a salt; and
  water qs to 100%; and
  the pH is in the range of from about 5.5 to about 8.0.

In some embodiments, the present disclosure is related to a formulation, comprising:
  compound I in crystal form K', crystal form M, crystal form Q, Hydrate $H_B$, or combinations thereof, present in an amount of about 0.5% w/v, about 1.0% w/v, about 1.5% w/v, about 2.0% w/v, or about 2.5% w/v,
  a non-ionic surfactant, which is tyloxapol in an amount of about 0.04 w/v to about 0.06% w/v, poloxamer in an amount of about 0.005-0.12% w/v, or combinations thereof;
  a suspending agent, which is hydroxypropyl methyl cellulose in an amount of from about 0.1% w/v to about 0.8 w/v %, polyethylene glycol in an amount of from about 2% w/v to about 8% w/v, carbomer homopolymer Type B in an amount from about 0.05% w/v to about 0.5% w/v, or combinations thereof;
  a tonicity agent which is mannitol or glycerin in an amount of from about 0.1% w/v to about 5% w/v;
  a buffer which is edetate, phosphate, borate, tromethamine, or combinations thereof;
  sodium chloride in an amount of from 0.01% w/v to about 1% w/v; and
  water qs to 100%; and
  having a pH is in the range of from about 5.5 to about 8.0.

In some embodiments, the present disclosure is related to a formulation, comprising:
  a suspension of 4-(7-Hydroxy-2-isopropyl-4-oxo-4H-quinazolin-3-yl)-benzonitrile (compound I) in crystal form K', crystal form M, crystal form Q, Hydrate $H_B$, or combinations thereof, in an amount of about 0.5% w/v, about 1.0% w/v, about 1.5% w/v, about 2.0% w/v, or about 2.5% w/v,
  tyloxapol in an amount of about 0.04 w/v to about 0.06% w/v;
  carbomer homopolymer Type B in an amount from about 0.05% w/v to about 0.4% w/v;

glycerin in an amount of from about 0.5% w/v to about 5% w/v;
a buffer selected from the group consisting of edetate, phosphate, borate, tomethamine, and combinations thereof;
sodium chloride in an amount of from 0.01% w/v to about 1% w/v; and
water qs to 100%;
wherein the formulation has a pH in the range of from about 5.5 to about 8.0.

In some embodiments of the formulations described herein, compound I is in polymorphic form B.

In some embodiments, the formulations described herein have a viscosity of about 20 cP to about 200 cP.

In some embodiments, the formulations described herein have an osmolality of about 200 to about 450 milliosmoles per kilogram (mOsm/kg).

In some embodiments of the formulations described herein, the $D_{90}$ of compound I (diameter at which 90% of compound I is comprised of smaller particles) is below about 10 μm, below about 8 μm, below about 6 μm, below about 4 μm, below about 3 μm, or about 2 μm. In some embodiments, the $D_{50}$ of compound I in the formulation (diameter at which 50% of compound I is comprised of smaller particles) is below about 10 μm, below about 8 μm, below about 6 μm, below about 4 μm, below about 3 μm, below about 2 μm, or about 1 μm. In some embodiments, the $D_{50}$ of compound I in the formulation (diameter at which 10% of compound I is comprised of smaller particles) is below about 5 μm, below about 4 μm, below about 3 μm, below about 2 μm, below about 1 μm, or about 0.3 μm.

In some embodiments, the present disclosure is related to a method of treating ocular surface pain in a subject in need thereof, comprising ocularly administering an effective amount of 4-(7-Hydroxy-2-isopropyl-4-oxo-4H-quinazolin-3-yl)-benzonitrile (compound of formula I) having structure:

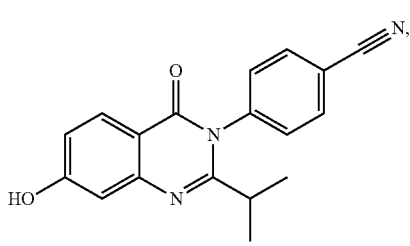

formula I or a salt, solvate, polymorph, or co-crystal thereof to the subject.

In some embodiments, the ocular surface pain is acute or episodic ocular surface pain. In some embodiments, the ocular surface pain is chronic ocular surface pain lasting for at least 1 month, at least 2 months, or at least 3 months. In some embodiments, the compound of Formula I is administered to the cornea of the subject.

In some embodiments, the COSP is associated with dry eye disease. In some embodiments, the administration results in a decrease in the symptoms of dry eye disease. In some embodiments, the administration results in a decrease in the pain associated with dry eye disease. In some embodiments, the administration results in reduced incidence of at least about 10% in one or more of ocular dryness, ocular discomfort, ocular hyperemia, ocular burning or stinging, grittiness or foreign body sensation, or photophobia.

In some embodiments, the subject suffers from one or more of dry eye disease, Sjogren's Syndrome, conjunctivitis (including keratoconjuctivitis, vernal keratoconjunctivitis, allergic conjunctivitis), Map-Dot-Fingerprint Dystrophy, acanthamoeba, fibromyalgia, Meibomian gland dysfunction, thyroid eye disease, rosacea, ptosis, keratoconus, ocular pain syndrome, Steven-Johnson's syndrome, corneal epitheliopathies, corneal neuropathies (including LASIK induced corneal neuropathies), corneal dystrophies (including recurrent corneal dystrophies), epithelial basement membrane dystrophy, corneal erosions or abrasions (including recurrent corneal erosions or abrasions), ocular surface diseases, blepharitis, graft vs host disease, meibomitis, glaucoma, conjunctivochalasis, keratopathis (including herpetic keratopathy, filamentary keratopathy, band or bullous keratopathy, exposure keratopathy), keratitis (including herpes simplex virus keratitis), iritis, episclentis, corneal surgery, multiple sclerosis, trichiasis, pterygium, neuralgia, xerophthalmia, patients recovering from neurotrophic keratitis, or ocular pain persisting for at least three months after photorefractive keratectomy (PRK) surgery or laser-assisted in situ keratomileusis (LASIK) surgery.

In some embodiments, the method comprises administering an additional therapeutic agent to the subject.

In some embodiments, the administration results in a reduction in a pain score on the visual acuity scale (VAS) of at least about 3, at least about 4, at least about 5, at least about 6, at least about 7, at least about 8, at least about 9 or at least about 10, compared to a placebo. In some embodiments, the reduction in VAS score arises from the difference in VAS scores prior to and after administration of compound I to the subject. In some embodiments, the reduction in VAS score occurs within about half hour, about one hour, within about 2 hours, within about 4 hours, or about 2-4 hours after administration of compound I to the subject.

In some embodiments, the administration of compound I results in a reduction in hyperemia in the subject of at least about 1, at least about 2, at least about 3, at least about 4, or at least about 5, on the McMonnies scale.

In some embodiments, the administration does not result in a change in one or more of best corrected visual acuity, intraocular pressure, slit-lamp biomicroscopy, dilated eye exam, blink rate, tear production, corneal staining, compared to a placebo.

In some embodiments, the compound of formula I is administered in the form of a formulation as described herein. In some embodiments, the formulation is administered for at least about one, about two, or about three months. In some embodiments, the formulation is administered one to four times daily.

In some embodiments, the disclosure provides a formulation as described herein, for use in the treatment of ocular surface pain. In some embodiments of the described uses, the ocular surface pain is episodic (e.g., acute) ocular surface pain or chronic ocular surface pain lasting for at least 1 month, at least 2 months, or at least 3 months.

In some embodiments, the disclosure provides a method of reducing ocular surface pain in a subject in need thereof, comprising ocularly administering 4-(7-Hydroxy-2-isopropyl-4-oxo-4H-quinazolin-3-yl)-benzonitrile (Formula I) having structure:

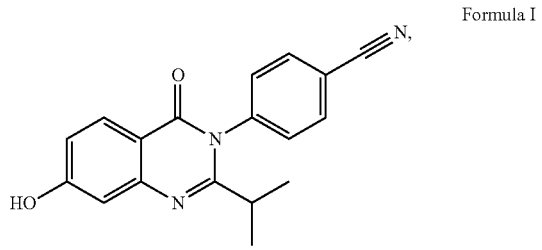 [SMILES: CC(C)c1nc2cc(O)ccc2c(=O)n1-c1ccc(C#N)cc1]

Formula I or a salt, solvate, polymorph, or co-crystal thereof to the subject.

In some embodiments, the ocular surface pain is episodic (e.g., acute) ocular surface pain the ocular surface pain is chronic ocular surface pain (COSP). In some embodiments, the COSP is associated with dry eye disease.

In some embodiments, the administration results in a decrease in the symptoms of dry eye disease. In some embodiments, the administration results in a decrease in the pain associated with dry eye disease. In some embodiments, the administration results in reduced incidence of at least about 10% in one or more of ocular dryness, ocular discomfort, ocular hyperemia, ocular burning or stinging, grittiness or foreign body sensation, or photophobia.

In some embodiments, the subject suffers from one or more of dry eye disease, Sjogren's Syndrome, conjunctivitis (including keratoconjuctivitis, vernal keratoconjunctivitis, allergic conjunctivitis), Map-Dot-Fingerprint Dystrophy, acanthamoeba, fibromyalgia, Meibomian gland dysfunction, thyroid eye disease, rosacea, ptosis, keratoconus, ocular pain syndrome, Steven-Johnson's syndrome, corneal epitheliopathies, corneal neuropathies (including LASIK induced corneal neuropathies), corneal dystrophies (including recurrent corneal dystrophies), epithelial basement membrane dystrophy, corneal erosions or abrasions (including recurrent corneal erosions or abrasions), ocular surface diseases, blepharitis, graft vs host disease, meibomitis, glaucoma, conjunctivochalasis, keratopathis (including herpetic keratopathy, filamentary keratopathy, band or bullous keratopathy, exposure keratopathy), keratitis (including herpes simplex virus keratitis), iritis, episclentis, corneal surgery, multiple sclerosis, trichiasis, pterygium, neuralgia, xerophthalmia, or patients recovering from neurotrophic keratitis. In some embodiments, the subject suffers from ocular pain persisting for at least three months after photorefractive keratectomy (PRK) surgery or laser-assisted in situ keratomileusis (LASIK) surgery.

In some embodiments, the method comprises administering an additional therapeutic agent to the subject.

In some embodiments, the administration results in a reduction in a pain score on the visual acuity scale (VAS) of at least about 3, at least about 4, at least about 5, at least about 6, at least about 7, at least about 8, at least about 9 or at least about 10, compared to a placebo. In some embodiments, the administration results in a reduction in a VAS pain score of at least about 6, at least about 7, at least about 8, at least about 9 or at least about 10, compared to a placebo. In some embodiments, the reduction in the pain score arises from the difference in pain scores prior to and after administration of compound I to the subject. In other embodiments, the reduction in pain score occurs after about 7 days of administration of compound I to the subject. In some embodiments, the reduction in pain score occurs after about 14 days of administration of compound I to the subject.

In some embodiments, the administration results in a reduction in hyperemia in the subject of least about 1, at least about 2, at least about 3, at least about 4, or at least about 5, on the McMonnies scale.

In some embodiments, the administration results in a reduction in a pain score on the visual acuity scale (VAS) of at least about 3 as compared to a VAS score prior to administration of the compound.

In some embodiments of the recited methods, the compound of formula I is administered in the form of a formulation as described herein.

Specific preferred embodiments of the invention will become evident from the following more detailed description of certain preferred embodiments and the claims.

DETAILED DESCRIPTION

Figure 1:
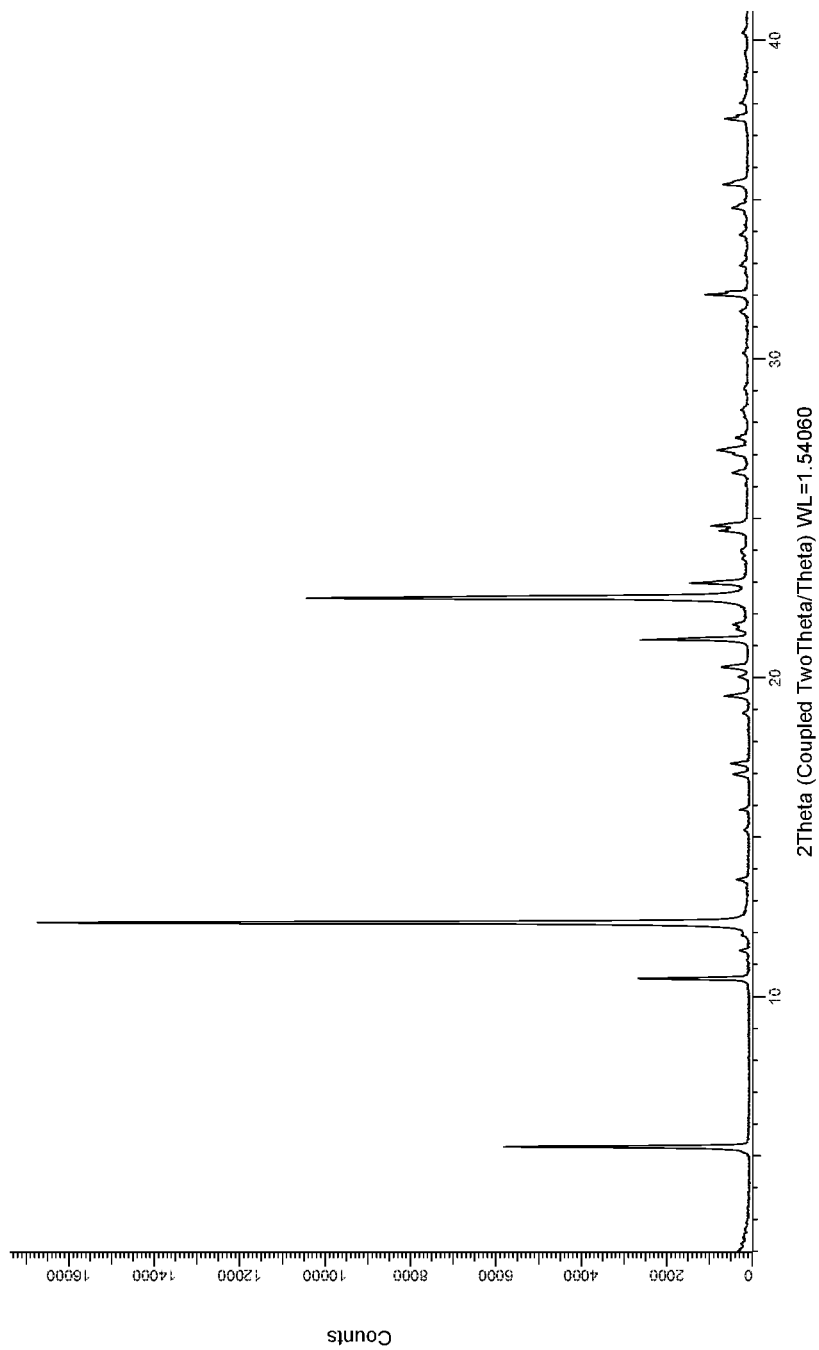
FIG. 1 provides the X-ray diffraction pattern for crystal form K' of compound I.

"TRPV1 receptor" refers to the Transient Receptor Potential Vanilloid 1 that has been characterized through molecular cloning and pharmacology. See e.g., Caterina M J, et al., Nature 1997; 389:816-824. TRPV1 receptor activity is measured as described in WO2005/120510, hereby incorporated by reference in its entirety.

The language "effective amount" of the compounds described herein, refers to that amount of a therapeutic compound necessary or sufficient to perform its intended function within a mammal. An effective amount of the therapeutic compound can vary according to factors such as the amount of the causative agent already present in the mammal, the age, sex, and weight of the mammal, and the ability of the therapeutic compounds of the present disclosure to treat the ocular surface disorder and/or symptoms thereof in the mammal.

The phrase "ophthalmically compatible" refers to formulations, polymers and other materials and/or dosage forms which are suitable for use in contact with the ocular tissues of human beings and animals without excessive toxicity, irritation, allergic response, or other problem or complication, commensurate with a reasonable benefit/risk ratio.

As used herein, the term "treat", "treating" or "treatment" in connection to a disease or disorder refers in some embodiments, to ameliorating the disease or disorder (i.e., slowing or arresting or reducing the development of the disease or at least one of the clinical symptoms thereof). In another embodiment "treat", "treating" or "treatment" refers to alleviating or ameliorating at least one physical parameter including those which may not be discernible by the patient. In yet another embodiment, "treat", "treating" or "treatment" refers to modulating the disease or disorder, either physically, (e.g., stabilization of a discernible symptom), physiologically, (e.g., stabilization of a physical parameter), or both. In yet another embodiment, "treat", "treating" or "treatment" refers to preventing or delaying the onset or development or progression of the disease or disorder or symptom thereof.

As used herein, the term "subject" or "patient" refers to human and non-human mammals, including but, not limited to, primates, rabbits, pigs, horses, dogs, cats, sheep, and cows. In particular embodiments, a subject or patient is a human. In some embodiments, the term "patient" or "subject" refers to a human being who is diseased with the condition (i.e., disease or disorder) described herein and who would benefit from the treatment. As used herein, a subject is "in need of" a treatment if such subject (patient) would benefit biologically, medically or in quality of life from such treatment. In particular embodiments, the subject is an adult human of at least about 18 years of age. In some embodiments, the subject is an adult human from about 18 years of age to about 75 years of age. In some embodiments, the subject is a child of up to about 18 years of age.

As used herein, "ocular surface" refers to the outer surface of the eye, which anatomically comprises the cornea (with epithelium, bowman layer, stroma, descement membrane, endothelium), conjunctiva, cul de sac, and the corneo-scleral junction, i.e. limbus.

As used herein, "pain" refers to constant or intermittent sensation of actual pain described as but not limited to stabbing, dull, sharp, or ache. Pain may also refer to similar related descriptors such as but not limited to burning, stinging, grittiness, foreign body sensation, dryness, sandy, tired, itchy, irritated, sensitivity to light.

As used herein, ocular administration includes administration to all parts of the eye including all parts of the ocular surface such as the cornea, conjunctiva, the cul de sac and the corneo-scleral junction, i.e., limbus.

As used herein, "ocular surface pain" refers to pain on the surface of the eye, e.g., cornea. Ocular pain may be nociceptive pain, which is generally caused by external physical or chemical damaging stimuli such as corneal surgery, inflammation, or other damage to the corneal surface. Ocular pain may also result from neuropathic pain, which may occur due to direct damage to the neurons of the body, resulting in messages of pain being sent to the central nervous system and brain regardless of the presence of noxious stimuli. As used herein "ocular surface pain" includes both nociceptive pain and neuropathic pain.

As used herein, the term "visual analog scale" (VAS) is a measure of pain intensity where a subject typically marks a place on a scale that aligns with their level of pain. The pain is marked in a range of "no pain" (score of 0) and "pain as bad as it could be" or "worst imaginable pain" (score of 100). See e.g., Hawker, et al., *Arthritis Care & Research* 63(11), pp. S240-S252 (November 2011). There are several other well-designed pain scales that may be used to help assess the extent of pain. The numerical rating scale (NRS) is often used, in which subjects use numbers to rate pain. The number scale may be from 1-10, or 1-100. The Wong-Baker FACES Pain Scale combines pictures and numbers for pain ratings. It can be used in children over the age of 3 and in adults. Six faces depict different expressions, ranging from happy to extremely upset. Each is assigned a numerical rating between 0 (smiling) and 10 (crying). The Verbal Pain Intensity Scale uses wordings on a scale to rate pain intensity: No Pain/Mild Pain/Moderate Pain/Severe Pain Very Severe Pain/Worst Possible Pain.

The Eye Sensation Scale is a specific pain scale was developed to measure ophthalmic pain severity. See Caudle L. E. et al., *Optom Vis Sci*. 2007 August; 84(8):752-62. In this scale, pain, discomfort or light sensitivity is typically measured by 5 category labels of "extreme," "severe," "moderate," "mild," or "none."

The Ocular Pain Assessment Survey (OPAS) is a quantitative, multidimensional questionnaire, specifically designed for assessment of corneal and ocular surface pain and Quality of Life (QoL) changes. The OPAS assesses pain intensity, frequency of eye and non-eye pain, QoL changes, aggravating factors, associated factors, and symptomatic relief quantitative, allowing for monitoring of treatment responses. See Qazi et al., *Ophthalmology* July 123(7):1458-1468 (2016).

As used herein, the term "Visual Tasking Questionnaire" refers to a questionnaire that asks the subject to subjectively rate how much difficulty they have conducting certain activities that require a fixed or prolonged stare that may exacerbate ocular pain. The questionnaire also asks about coping mechanisms associated with the difficulties they experience during visual tasking activities.

As used herein, ocular hyperemia refers to redness of the ocular surface. Ocular hyperemia may be a clinical marker for inflammation and/or ocular irritation. Ocular hyperemia is typically measured using the McMonnies scale, at values from 0 to 5, based on standard photographs.

As used herein, "placebo" refers to an ophthalmic formulation that includes all the components of the administered drug composition without the drug.

As used herein, the term "about" refers to a range of values+10% of a specified value.

As used herein "polymorph" refers to crystalline forms having the same chemical composition but different spatial arrangements of the molecules, atoms, and/or ions forming the crystal.

As used herein "solvate" refers to a crystalline form of a molecule, atom, and/or ions that further comprises molecules of a solvent or solvents incorporated into the crystalline lattice structure. The solvent molecules in the solvate may be present in a regular arrangement and/or a non-ordered arrangement. The solvate may comprise either a stoichiometric or nonstoichiometric amount of the solvent molecules. For example, a solvate with a nonstoichiometric amount of solvent molecules may result from partial loss of solvent from the solvate. Solvates may occur as dimers or oligomers comprising more than one molecule of compound I within the crystalline lattice structure.

As used herein "amorphous" refers to a solid form of a molecule, atom, and/or ions that is not crystalline. An amorphous solid does not display a definitive X-ray diffraction pattern.

As used herein, "substantially pure," when used in reference to a form, means a compound having a purity greater than 90 weight %, including greater than 90, 91, 92, 93, 94, 95, 96, 97, 98, and 99 weight %, and also including equal to about 100 weight % of compound I, based on the weight of the compound. The remaining material comprises other form(s) of the compound, and/or reaction impurities and/or processing impurities arising from its preparation. For example, a crystalline form of compound I may be deemed substantially pure in that it has a purity greater than 90 weight %, as measured by means that are at this time known and generally accepted in the art, where the remaining less than 10 weight % of material comprises other form(s) of compound I and/or reaction impurities and/or processing impurities.

As used herein, "Compound of formula I," "Compound I," "Formula I," and "compound I" are used interchangeably and mean a compound that has the name 4-(7-hydroxy-2-isopropyl-4-oxo-4H-quinazolin-3-yl)-benzonitrile, the structure shown below, and can be synthesized using procedures known in the art and described in WO2005/120510 and U.S. Pat. No. 8,349,852 ("Quinazolinone derivatives useful as vanilloid antagonists") to Chen et al., both of which are hereby incorporated by reference in their entireties.

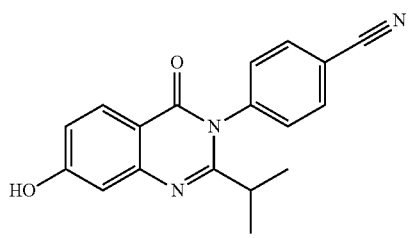 [SMILES: CC(C)c1nc2cc(O)ccc2c(=O)n1-c1ccc(C#N)cc1]

As used herein, "crystal form," "crystalline form," "modification," or "polymorph," or "polymorphic form" in upper or lower case are used interchangeably and refer to the crystalline or polymorphic form of compound I. Compound I may be used in amorphous or crystalline forms. Additionally or alternatively, various crystalline and polymorphic forms of Compound (I) may be used. As used herein, "polymorphic forms" or "polymorphs" of compound (I) is intended to encompass crystalline hydrates or other crystalline solvates of compound (I).

Any chemical formula given herein is also intended to represent unlabeled forms as well as isotopically labeled forms of the compounds. Isotopically labeled compounds have structures depicted by the formulae given herein except that one or more atoms are replaced by an atom having a selected atomic mass or mass number. Isotopes that can be incorporated into compounds of the disclosure include, for example, isotopes of hydrogen, carbon, nitrogen, and oxygen, such as $^3H$, $^{11}C$, $^{13}C$, $^{14}C$, and $^{15}N$. Accordingly, it should be understood that methods of the present invention can or may involve compounds that incorporate one or more of any of the aforementioned isotopes, including for example, radioactive isotopes, such as $^3H$ and $^{14}C$, or those into which non-radioactive isotopes, such as $^2H$ and $^{13}C$ are present. Such isotopically labelled compounds are useful in metabolic studies (with $^{14}C$), reaction kinetic studies (with, for example $^2H$ or $^3H$), detection or imaging techniques, such as positron emission tomography (PET) or single-photon emission computed tomography (SPECT) including drug or substrate tissue distribution assays, or in radioactive treatment of patients. Isotopically-labeled compounds can generally be prepared by conventional techniques known to those skilled in the art, e.g., using an appropriate isotopically-labeled reagents in place of the non-labeled reagent previously employed.

The present invention encompasses embodiments that include all pharmaceutically acceptable salts of the compounds useful according to the invention provided herein. As used herein, "pharmaceutically acceptable salt" refers to derivatives of the disclosed compounds wherein the parent compound is modified by converting an existing acid or base moiety to its salt form. Examples of pharmaceutically acceptable salts include, but are not limited to, mineral or organic acid salts of basic residues such as amines; alkali or organic salts of acidic residues such as carboxylic acids; and the like. The pharmaceutically acceptable salts include the conventional non-toxic salts of the parent compound formed, for example, from non-toxic inorganic or organic acids. The pharmaceutically acceptable salts can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, non-aqueous media like ether, ethyl acetate, ethanol, isopropanol, or acetonitrile are preferred. Lists of suitable salts are found in *Remington's Pharmaceutical Sciences,* 17$^{th}$ ed., Mack Publishing Company, Easton, Pa., 1985, p. 1418 and *Journal of Pharmaceutical Science,* 66, 2 (1977), each of which is incorporated herein by reference in its entirety. For example, preferred pharmaceutically acceptable salts include, but are not limited to, mineral or organic acid salts of basic residues such as amines. For example, the salt can be a hydrochloride salt. Other examples of suitable salts can be found in U.S. Pat. No. 8,349,852, the content of which is hereby incorporated by its entirety.

The phrase "pharmaceutically acceptable" as employed herein refers to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

Unless indicated otherwise, all ingredient concentrations are presented in units of % weight/volume (% w/v). As is commonly understood, the % w/v value refers to the amount of the particular component or ingredient in the formulation. It is commonly understood that equivalent concentrations can be expressed in different units. For example, a concentration of 0.1% w/v can also be expressed as a 1 mg/ml solution.

Unless otherwise specified, the weight or dosage referred to herein for the compound of formula I is the weight or dosage of the compound itself, not that of a salt or prodrug thereof, which can be different to achieve the intended therapeutic effect. For example, the weight or dosage of a corresponding salt of a compound suitable for the methods, compositions, or combinations disclosed herein may be calculated based on the ratio of the molecular weights of the salt and compound itself.

Crystal form B of compound I is described in U.S. Pat. No. 8,349,852, incorporated by reference herein. Polymorph B is characterized by an X-ray diffraction pattern having three or more peaks at 2θ values selected from 9.3, 10.6 and 14.4.+−.0.2 °2θ. In some embodiments, polymorph B is characterized by an X-ray diffraction pattern having three or more peaks at 2θ values selected from 9.3, 10.6, 14.4, 15.5, 17.9, 19.9, 23.4±0.2 °2θ.

Crystal Forms of Compound I

In one aspect, the present invention relates to crystal form K' of 4-(7-Hydroxy-2-isopropyl-4-oxo-4H-quinazolin-3-yl)-benzonitrile (compound I) having an X ray diffraction pattern having three or more peaks at 2θ values selected from 5.3, 12.3, and 22.5±0.2 °2θ. In some embodiments, crystal form K' of compound I is characterized by an X ray diffraction pattern having three or more peaks at 2θ values selected from 5.3, 10.6, 12.3, 21.2, 22.5, and 23.0±0.2 °2θ. In some embodiments, crystal form K' is characterized by an X-ray diffraction pattern having 3 or more, 4 or more, 5 or more, 6 or more, or 7 or more peaks at 2θ values selected from 5.3, 10.6, 12.3, 17.0, 17.3, 19.4, 20.3, 21.2, 22.5, 23.0, 24.8, 27.1, 32.0±0.2 °2θ. In some embodiments, the present invention relates to a method of preparing a crystal form K' of compound I, comprising evaporating a solution of compound I in about 1:1 (v/v) n-butanol/dichloromethane, to crystallize compound I as crystal form K'.

In one embodiment, a crystal form K' of compound I is provided in substantially pure form. This crystal form K' of compound I in substantially pure form may be employed in pharmaceutical compositions, e.g., ophthalmic formulations as described herein. In some embodiments, the disclosure provides for pharmaceutical formulations including compound I in crystal form K'. In some embodiments, the present disclosure provides ophthalmic suspensions of compound I, wherein at least 10%, at least about 20%, at least about 30%, at least about 40%, at least about 50%, at least about 60%, at least about 70%, at least about 80%, or at least 90% of compound I is present as crystal form K'.

In one aspect, the present invention relates to crystal form M of 4-(7-Hydroxy-2-isopropyl-4-oxo-4H-quinazolin-3-yl)-benzonitrile (compound I) having an X ray diffraction pattern having three or more peaks at 2θ values selected from 11.1, 18.5, 19.1±0.2 °2θ. In particular embodiments, crystal form M of compound I is characterized by an X ray diffraction pattern having three or more peaks at 2θ values selected from 11.1, 12.1, 18.5, 19.1, 20.1, 21.4±0.2 °2θ. In some embodiments, crystal form M is characterized by an X-ray diffraction pattern having 3 or more, 4 or more, 5 or more, 6 or more, or 7 or more peaks at 2θ values selected from 11.1, 12.1, 18.5, 19.1, 20.1, 21.4, 21.7, 22.2, 23.1, 26.4, 273, 29.7±0.2 °2θ. In some embodiments, the invention relates to a method of preparing a crystal form M of compound I, comprising slurrying compound I in crystal form B in acetone at room temperature for at least 24 hours, at least 2 days, at least 3 days, at least 4 days, or at least 5 days. Alternatively, crystal form M may be obtained by slurrying crystal form B of compound I in acetone, ethanol, 1:1 ethanol/water, methanol or 1:1 methanol/water at 50° C. for 2 weeks.

In one embodiment, a crystal form M of compound I is provided in substantially pure form. This crystal form M of compound I in substantially pure form may be employed in pharmaceutical compositions, e.g., ophthalmic formulations as described herein. In some embodiments, the disclosure provides for pharmaceutical formulations including compound I in crystal form M. In some embodiments, the present disclosure provides ophthalmic suspensions of compound I, wherein at least 10%, at least about 20%, at least about 30%, at least about 40%, at least about 50%, at least about 60%, at least about 70%, at least about 80%, or at least 90% of compound I is present as crystal form M.

In one aspect, the present invention relates to crystalline Hydrate $H_B$ of 4-(7-Hydroxy-2-isopropyl-4-oxo-4H-quinazolin-3-yl)-benzonitrile (compound I) having an X ray diffraction pattern having three or more peaks at 2θ values selected from 6.6, 12.2, 15.8±0.2 °2θ. In particular embodiments, the crystalline Hydrate $H_B$ of compound I is characterized by an X ray diffraction pattern having three or more peaks at 2θ values selected from _6.6, _12.2, _14.6, 15.8, 16.1, 18.5, 20.9, 24.7±0.2 °2θ. In some embodiments, Hydrate $H_B$ is characterized by an X-ray diffraction pattern having 3 or more, 4 or more, 5 or more, 6 or more, or 7 or more peaks at 2θ values selected from 6.6, 11.7, _12.2, _14.6, 15.8, 16.1, 18.5, 19.7, 20.9, 24.7, 26.5, 27.7, 29.3±0.2 °2θ. In some embodiments, the present invention relates to a method of preparing crystalline hydrate $H_B$ of compound I, comprising slurrying compound I in crystal form B in a about 1:1 mixture of acetone and water at room temperature for at least 5 days, at least 6 days, or at least 7 days, to provide compound I as crystalline Hydrate $H_B$.

In one embodiment, a Hydrate $H_B$ of compound I is provided in substantially pure form. This Hydrate $H_B$ of compound I in substantially pure form may be employed in pharmaceutical compositions, e.g., ophthalmic formulations as described herein. In some embodiments, the disclosure provides for pharmaceutical formulations including compound I as Hydrate $H_B$. In some embodiments, the present disclosure provides ophthalmic suspensions of compound I, wherein at least 10%, at least about 20%, at least about 30%, at least about 40%, at least about 50%, at least about 60%, at least about 70%, at least about 80%, or at least 90% of compound I is present as Hydrate $H_B$.

In one aspect, the present invention relates to crystal form Q of 4-(7-Hydroxy-2-isopropyl-4-oxo-4H-quinazolin-3-yl)-benzonitrile (compound I) having an X ray diffraction pattern having three or more peaks at 2θ values selected from 11.2, 12.2, 19.1±0.2 °2θ. In particular embodiments, crystal form Q of compound I is characterized by an X ray diffraction pattern having three or more peaks at 2θ values selected from 11.2, 12.2, 18.5, 19.1, 20.1, 22.0, 22.5, 23.3, 26.5±0.2 °2θ. In some embodiments, crystal form A is characterized by an X-ray diffraction pattern having 3 or more, 4 or more, 5 or more, 6 or more, or 7 or more peaks at 2θ values selected from 11.2, 12.2, 17.7, 18.5, 19.1, 20.1, 22.0, 22.5, 23.3, 24.2, 24.6, 26.5, 28.5±0.2 °2θ. In some embodiments, the present invention relates to a method of preparing a crystal form Q of compound I according to claims 10-11, comprising slurrying compound I in crystal form B in about 1:1 (v/v) n-butanol/dichloromethane, to obtain compound I as crystal form Q.

In one embodiment, a crystal form Q of compound I is provided in substantially pure form. This crystal form Q of compound I in substantially pure form may be employed in pharmaceutical compositions, e.g., ophthalmic formulations as described herein. In some embodiments, the disclosure provides for pharmaceutical formulations including compound I in crystal form Q. In some embodiments, the present disclosure provides ophthalmic suspensions of compound I, wherein at least 10%, at least about 20%, at least about 30%, at least about 40%, at least about 50%, at least about 60%, at least about 70%, at least about 80%, or at least 90% of compound I is present as crystal form Q.

In some embodiments, the present invention provides formulations of the compound of formula I. In some embodiments, the formulations are aqueous suspensions of a compound of formula I. In some embodiments, the suspension includes the compound of formula I at a concentration of from about 0.5% to about 1.5% w/v, about 0.5% to about 2.5% w/v, about 0.5% to about 3.5% w/v, about 0.5% to about 3.0% w/v, about 1.0% to about 2.5% w/v, about 1.5% to about 3.0% w/v, about 0.5% to about 2.5% w/v. In some embodiments, the concentration of the compound of formula I in a formulation for topical ocular use is at least about 0.5% w/v, at least about 1.0% w/v, at least about 1.5% w/v, at least about 2.0% w/v, or at least about 2.5% w/v. In some embodiments, the concentration of the compound of formula I in a formulation for topical use is no more than about 5.0% w/v, no more than about 4.5% w/v, no more than about 4.0% w/v, no more than about 3.5% w/v, or no more than about 3.0% w/v. In particular embodiments, the concentration of the compound of formula I in a formulation for topical use is about 0.5% w/v, about 1.0% w/v, about 1.5% w/v, about 2.0% w/v, about 2.5% w/v, about 3.0% w/v, or about 3.5% w/v. Expressed in units of mg/ml, in some embodiments, compound of formula I is administered to the subject at a concentration of about 5 mg/ml to about 35 mg/ml, about 5 mg/ml to about 25 mg/ml, or about 5 mg/ml to about 15 mg/ml, about 5 mg/ml to about 30 mg/ml, about 10 mg/ml to about 25 mg/ml, about 15 mg/ml to about 30 mg/ml, or about 5 mg/ml to about 25 mg/ml. In some embodiments, the concentration of the compound of formula I in a formulation for topical use is at least about 5 mg/ml, at least about 10 mg/ml, at least about 15 mg/ml, at least about 20 mg/ml, or at least about 25 mg/ml. In some embodiments, the concentration of the compound of formula I in a formulation for topical use is no more than about 50 mg/ml, no more than about 45 mg/ml, no more than about 40 mg/ml, no more than about 35 mg/ml, or no more than about 30 mg/ml. In particular embodiments, the compound of formula I is administered at a concentration of about 5 mg/ml, about 10 mg/ml, about 15 mg/ml, about 20 mg/ml, about 25 mg/ml, about 30 mg/ml, or about 35 mg/ml. In some embodiments, the compound of formula I is present in the form of in crystal form K', crystal form M, crystal form Q, Hydrate $H_B$, or combinations thereof. In some embodiments, compound I is present as crystal form K' in substantially pure form in the ophthalmic formulations described herein. In some embodiments, compound I is present as substantially pure form as crystal M in the ophthalmic formulations described herein. In some embodiments, compound I is present as Hydrate $H_B$ in substantially pure form in the ophthalmic formulations described herein. In some embodiments, compound I is present as crystal form Q in substantially pure form in the ophthalmic formulations described herein. In particular embodiments, compound I is present in the formulation as a mixture of two or more crystalline forms in different ratios. In some embodiments, compound I is present as a mixture of crystal forms B and K', crystal forms B and M, crystal form B and Hydrate $H_B$, crystal forms B and Q, crystal forms M and Hydrate $H_B$, in ratios of from about 1:99 to about 99:1.

In some embodiments, the formulation further includes at least one opthalmically acceptable excipient.

In some embodiments, the formulations include an ophthalmically acceptable surfactant. In some embodiments, the surfactant is an anionic surfactant. In specific embodiments, the anionic surfactant is selected from $C_{10}$-$C_{22}$ alkylsulfates, $C_{10}$-$C_{22}$alkyl(oligooxyalkylene)sulfates, $C_4$-$C_{22}$ alkyl sulfosuccinate esters, $C_{10}$-$C_{22}$acylsarcosinatesand $C_{10}$-$C_{22}$ alkylcarboxylates; wherein oligooxyalkylene moieties have from one to five oxy-$C_1$-$C_6$ alkylene moieties, e.g., oxyethylene moieties. The anionic surfactants may have a countercation is selected from alkali metal, e.g., sodium, $C_1$-$C_3$ alkylammonium, tri($C_1$-$C_3$ alkanol)ammonium, e.g., triethanolammonium, di($C_1$-$C_3$ alkanol)ammonium and ammonium cations. The concentration of anionic surfactant in the formulation is from about 0.005 to 0.1 g/L, or 0.005 to 0.05 g/L. In some embodiments, the surfactant is a cationic surfactant. Non-limiting examples of cationic surfactants include alkylamine salts, alkylamine polyoxyethylene adduct, a fatty acid triethanolamine monoester salt, acyl aminoethyl diethylamine salts, fatty acid polyamine condensates, alkyl imidazolines, 1-acyl aminoethyl-2-alkyl imidazoline, 1-hydroxyethyl-2-alkyl imidazoline, include chlorhexidine or the like salts thereof, chlorhexidine or a salt thereof, e.g., chlorhexidine gluconate. In some embodiments, the cationic surfactant is present in the formulation in an amount of from about 0.001 to about 5% w/v, or about 0.001 to about 1% w/v, or about 0.001 to about 0.1% w/v, or about 0.001 to about 0.01% w/v, or about 0.001 to about 0.005% w/v.

In specific embodiments, the surfactant is a non-ionic surfactant. In some embodiments, the non-ionic surfactant is a polysorbate surfactant, a block copolymer of ethylene oxide and propylene oxide surfactant (e.g., a pluronic or tetronic surfactant), poloxamer, tyloxapol, or combinations thereof. Tyloxapol is a nonionic liquid polymer of the alkyl aryl polyether alcohol type. Poloxamers are nonionic triblock copolymers composed of a central hydrophobic chain of polyoxypropylene (poly(propylene oxide)) flanked by two hydrophilic chains of polyoxyethylene (poly(ethylene oxide)). In particular embodiments, the non-ionic surfactant is tyloxapol. In some embodiments, the tyloxapol is present in an amount at least about 0.001% w/v, at least about 0.01% w/v, at least about 0.02% w/v, at least about 0.03% w/v, at least about 0.04% w/v, and no more than about 1% w/v, no more than about 0.5% w/v, no more than about 0.3% w/v, or no more than about 0.2% w/v, no more than about 0.1% w/v, or no more than about 0.08% w/v. In particular embodiments, the non-ionic surfactant is tyloxapol, present in an amount of about 0.03% w/v to 0.08% w/v, or about 0.05% w/v.

In some embodiments, the formulations include about 15-20% w/v of a poloxamer surfactant. In some embodiments, the formulations include about 15, about 15.5%, about 16%, about 16.5%, about 17%, about 17.5%, about 18%, about 18.5%, about 19%, about 19.5%, or about 20% w/v of poloxamer. In particular embodiments, the formulations include about 17.5% w/v poloxamer. In yet particular embodiments, the poloxamer is Poloxamer 407. In particular embodiments, the surfactant is substantially all tyloxapol.

In some embodiments, the formulations include a suspending agent. In some embodiments, the suspending agent is a carbomer, hydroxypropyl methyl cellulose (hypromellose), polyethylene glycol, or combinations thereof. Carbomers are carboxyvinyl polymers that have a network of cross-linked polymer chains. The polymers are often characterized as having carboxylic acid functional groups and may contain from 2 to 7 carbon atoms per functional group. Carbomers, i.e. synthetic high-molecular-weight polymers of acrylic acid that are crosslinked e.g. with allyl sucrose or allyl ethers of pentaerythritol, particularly water-soluble and water-swellable carbomers. Carbomers are available under the trade name CARBOPOL® from various suppliers In particular embodiments, the carbomer is carbomer homopolymer Type B. In particular embodiments, the carbomer is CARBOPOL® 934P (Carbomer 934P), 940 or 974P. In some embodiments, the suspending agent is carbomer and is present in the formulation in an amount of at least about 0.05% w/v, at least about 0.1% w/v, or at least about 0.2% w/v, and no greater than about 1.0% w/v, no greater than about 0.6% w/v, or no greater than about 0.5%. In particular embodiments, the suspending agent is carbomer, and is present in the formulation in an amount of 0.1% w/v to about 0.3% w/v, or about 0.2% w/v.

In some embodiments, the suspending agent is hydroxypropyl methyl cellulose. In particular embodiments, the hydroxypropyl methyl cellulose is present in the formulation in an amount of at least about 0.05% w/v, at least about 0.1% w/v, or at least about 0.25% w/v, and less than about 1.8% w/v, less than about 1.0% w/v, less than about 0.8% w/v, or less than about 0.6% w/v. In some embodiments, the hydroxypropyl methyl cellulose is present in the formulation in an amount of from about 0.1% w/v to about 0.8 w/v %; from about 0.1% w/v to about 0.6% w/v; from about 0.25% w/v to about 0.8% w/v; from about 0.4% w/v to about 0.6% w/v.

In some embodiments, the suspending agent is a polyethylene glycol (PEG) having molecular weight of at least about 200 Da. In some embodiments, the PEG has a molecular weight of at least about 400, 1,000, 2,000, 3,000, 4,000, 6,000, or about 10,000 Da. In some embodiments, the suspending agent is a polyethylene glycol (PEG) having molecular weight of from about 200 to about 20,000 Da. In some embodiments, the PEG has a molecular weight of about 400, 1,000, 2,000, 3,000, 4,000, 6,000, or about 10,000 Da. In some embodiments, the PEG is present in the formulation in an amount of at least 1% w/v, at least about 2% w/v, at least about 3% w/v, and less than about 10% w/v, less than about 9% w/v, or less than about 8% w/v. In particular embodiments, the suspending agent is PEG400 at a concentration of from about 4% w/v to about 9% w/v, about 5% w/v to about 8% w/v, or about 7% w/v. In particular embodiments, the suspending agent is PEG6000 at a concentration of from about 1% w/v to about 4% w/v, about 1% w/v to about 3% w/v, or about 2% w/v.

In particular embodiments, the suspending agent is a combination of more than one suspending agent. In other embodiments, the suspending agent is substantially all carbomer.

In some embodiments, the suspending agent can provide the desired viscosity of the formulation. Without being bound by theory, it is believed that the appropriate viscosity is beneficial in maintaining compound I in a suspended state in the formulation without settling and caking. In some embodiments, the formulation viscosity is from about 10 to about 200 cP (centipoise), from about 20 cP to about 200 cP, or from about 20 cP to about 150 cP. In some embodiments, the formulation viscosity is at least about 10 cP, 20 cP, 50 cP, 100 cP, or at least about 150 cP. Viscosity measurements for the formulations are measured using a Brookfield viscometer using spindle CP-42 at either 3 rpm or 60 rpm. Viscosity is typically measured at room temperature, i.e., 25° C.

In some embodiments, the formulation includes a tonicity agent. In some embodiments, the tonicity agent is a polyol. As used herein, the term "polyol" includes any compound having at least one hydroxyl group on each of two adjacent carbon atoms that are not in trans configuration relative to each other. The polyols can be linear or cyclic, substituted or unsubstituted, or mixtures thereof, so long as the resultant complex is water soluble and pharmaceutically acceptable. Examples of such compounds include: sugars, sugar alcohols, sugar acids and uronic acids. In some embodiments, the tonicity agent is a polyol such as sugars, sugar alcohols and sugar acids, including, but not limited to: mannitol, glycerin, xylitol, sorbitol and propylene glycol, or combinations thereof. In particular embodiments, the composition includes mannitol, glycerin or a combination thereof. In some embodiments, the amount of polyol in the formulation is from about 0.05% w/v to about 10% w/v, from about 0.1% to about 8% w/v, from about 0.1% to about 7% w/v, from about 0.1% to about 5% w/v. In particular embodiments, the tonicity agent is mannitol or glycerin, which is present in the formulation in an amount of from about 0.1% w/v to about 5% w/v, or about 0.2% w/v, about 0.3% w/v, about 0.4% w/v, about 0.5% w/v, about 1% w/v, about 2% w/v, about 2.5% w/v, about 3.0% w/v, about 3.5% w/v, about 4.0% w/v, about 4.5% w/v, or about 5% w/v. In particular embodiments, the tonicity agent is mannitol. In particular embodiments, the tonicity agent is glycerin.

In some embodiments, the formulation includes a buffer. Examples of buffer substances include acetate, ascorbate, borate, hydrogen carbonate, carbonate, citrate, edetate (EDTA) gluconate, lactate, phosphate, propionate and TRIS (tromethamine) buffers. In particular embodiments, the buffer is a phosphate buffering system. In particular embodiments, the buffer is a tromethamine buffer. The amount of buffer substance added is, typically, that necessary to ensure and maintain a physiologically tolerable pH range. In some embodiments, the pH range is in the range of from about 4 to about 9, from about 4.5 to about 8.5, from about 5.0 to about 8.0, from about 5.5 to about 8.0, from about 6.4 to about 8.4. In some embodiments, the pH is about 6.0. In particular embodiments, the pH is about 7.4.

In some embodiments, the formulation includes a salt. In some embodiments, salt is sodium chloride, potassium chloride, calcium chloride, or magnesium chloride. In particular embodiments, the salt is sodium chloride. In particular embodiments, the salt is present in an amount of at least about 0.01% w/v, at least about 0.02% w/v, at least about 0.03% w/v, at least about 0.04% w/v, and no more than about 0.5% w/v, no more than about 0.4% w/v, no more than about 0.3% w/v, no more than about 0.2% w/v, or no more than about 0.1% w/v. In particular embodiments, the salt is present in an amount of from about 0.01% w/v to about 0.5% w/v, from about 0.02% w/v to about 0.4% w/v, from about 0.03% w/v to about 0.3% w/v, from about 0.04% w/v to about 0.2% w/v, from about 0.05% w/v to about 0.1% w/v. In particular embodiments, the salt is sodium chloride and is present in the formulation in an amount of about 0.02% to about 0.07% w/v, or about 0.05% w/v.

In some embodiments, the formulations described herein have an osmolality of about 200 to about 450 milliosmoles per kilogram (mOsm/kg), about 200 to about 400 mOsm/kg, about 200 to about 300 mOsm/kg, or about 240 to about 360 mOsm/kg.

In some embodiments, the formulation may also be self-preserved and does not include a preservative. In other embodiments, the formulation includes a preservative. In some embodiments, the preservative includes, without limitation, polyhexylmethylene biguanidine (PHMB), polymeric quaternary ammonium compound (e.g., polyquaternium-1), chlorine containing preservatives such as benzalkonium chloride (BAK), chlorite preservatives or others.

In some embodiments, the preservative is polymeric quaternary ammonium compounds that are ophthalmically acceptable. Compounds of this type are described in U.S. Pat. Nos. 3,931,319; 4,027,020; 4,407,791; 4,525,346; 4,836,986; 5,037,647 and 5,300,287; and PCT application WO 91/09523 (Dziabo et al.). In particular embodiments, the polymeric ammonium compound is polyquaternium 1, otherwise known as POLYQUAD® or ONAMERM® with a number average molecular weight between 2,000 to 30,000. In still particular embodiments, the number average molecular weight is between 3,000 to 14,000.

When used, the polymeric quaternary ammonium compound is generally used in an amount that is greater than about 0.00001 w/v %, greater than about 0.0003 w/v %, or greater than about 0.0007 w/v % of the formulation. Moreover, the polymeric quaternary ammonium compound, when used in the formulation, is generally used at a concentration that is less than about 0.03 w/v %, less than about 0.003 w/v %, or less than about 0.0015 w/v % of the formulation. In some embodiments, the concentration of polymeric quaternary ammonium compound in the formulation are as follows: greater than about 0.0003 w/v % but less than about 0.003 w/v %; greater than about 0.0003 w/v % but less than about 0.0015 w/v %; greater than about 0.0007 w/v % but less than about 0.003 w/v %; and greater than about 0.0007 w/v % but less than about 0.0015 w/v %. In particular embodiments, the formulation includes polyquarternium 1 at a concentration of about 0.001% w/v.

In some embodiments, the formulation includes BAK at a concentration that is at least about 0.0005 w/v %, about 0.001 w/v %, or greater than about 0.007 w/v % of the formulation, and at a concentration that is less than about 0.1 w/v %, less than about 0.02 w/v %, or less than about 0.0035 w/v % of the ophthalmic composition. It is specifically contemplated that any of the lower limits on the concentration of BAK may be used in conjunction with any of the upper limits on the concentrations of BAK. In particular embodiments, the concentration of BAK in the composition are as follows: greater than about 0.001 w/v % but less than about 0.02 w/v %; greater than about 0.001 w/v % but less than about 0.0035 w/v %; greater than about 0.007 w/v % but less than about 0.02 w/v %; and greater than about 0.007 w/v % but less than about 0.0035 w/v %.

In some embodiments, described herein is an aqueous formulation that includes:
- 4-(7-hydroxy-2-isopropyl-4-oxo-4H-quinazolin-3-yl)-benzonitrile (compound I) or a salt, co-crystal, or polymorph thereof, in an amount of about 0.5% w/v to about 3.5% w/v,
- and one or more excipients selected from the group consisting of a surfactant, a suspending agent, a tonicity agent, a buffer, a preservative, a salt, and a preservative.

In some embodiments, described herein is an aqueous formulation that includes:
- 4-(7-hydroxy-2-isopropyl-4-oxo-4H-quinazolin-3-yl)-benzonitrile (compound I) or a salt, co-crystal, or polymorph thereof, present as a suspension in the formulation, in an amount of about 0.5% w/v to about 3.5% w/v,
- and one or more excipients selected from the group consisting of a surfactant, a suspending agent, a tonicity agent, a buffer, a preservative, a salt, and a preservative.

In some embodiments, described herein is an aqueous formulation that includes:
- 4-(7-hydroxy-2-isopropyl-4-oxo-4H-quinazolin-3-yl)-benzonitrile (compound I) or a salt, co-crystal, or polymorph thereof, present as a suspension in the formulation,
- and one or more excipients selected from the group consisting of a surfactant, a suspending agent, a tonicity agent, a buffer, a preservative, a salt, and a preservative.

In some embodiments, described herein is an aqueous formulation that includes:
- a suspension of 4-(7-hydroxy-2-isopropyl-4-oxo-4H-quinazolin-3-yl)-benzonitrile (compound I) or a salt, co-crystal, or polymorph thereof,
- and one or more excipients selected from the group consisting of a surfactant, a suspending agent, a tonicity agent, a buffer, a preservative, a salt, and a preservative.

In some embodiments, described herein is an aqueous formulation that includes:
- 4-(7-hydroxy-2-isopropyl-4-oxo-4H-quinazolin-3-yl)-benzonitrile (compound I) in crystal form K', crystal form M, crystal form Q, Hydrate $H_B$, or combinations thereof, in an amount of about 0.5% w/v to about 3.5% w/v, present as a suspension in the formulation
- a surfactant,
- a suspending agent,
- and one or more excipients selected from the group consisting of a tonicity agent, a buffer, a preservative, a salt, and a preservative.

In some embodiments, the invention described herein is a formulation that includes:
- 4-(7-hydroxy-2-isopropyl-4-oxo-4H-quinazolin-3-yl)-benzonitrile (compound I) in crystal form K', crystal form M, crystal form Q, Hydrate $H_B$, or combinations thereof, in an amount of about 0.5% w/v to about 3.5% w/v, present as a suspension in the formulation,
- a non-ionic surfactant;
- a suspending agent;
- a tonicity agent;
- a buffer;
- a salt; and
- optionally, a preservative.

In some embodiments, the invention described herein is a formulation that includes:
- a suspension of 4-(7-Hydroxy-2-isopropyl-4-oxo-4H-quinazolin-3-yl)-benzonitrile (compound I) in crystal form K', crystal form M, crystal form Q, Hydrate $H_B$, or combinations thereof, in an amount of about 0.5% w/v to about 3.5% w/v,
- a non-ionic surfactant;
- a suspending agent;
- a tonicity agent;
- a buffer;
- a salt;
- optionally, a preservative; and
- water qs to 100%.

In some embodiments, the invention described herein is a formulation that includes:
- a suspension of 4-(7-Hydroxy-2-isopropyl-4-oxo-4H-quinazolin-3-yl)-benzonitrile (compound I) in crystal form K', crystal form M, crystal form Q, Hydrate $H_B$, or combinations thereof, in an amount of about 0.5% w/v to about 2.5% w/v,
- a non-ionic surfactant selected from tyloxapol, poloxamer, or combinations thereof in an amount of from about 0.01 to 0.2% w/v;
- a suspending agent selected from hydroxypropyl methyl cellulose, polyethylene glycol or carbomer homopolymer Type B;
- a tonicity agent selected from polyols in an amount of from about 0.05% w/v to about 10% w/v;
- a buffer selected from edetate, phosphate, borate, or combinations thereof;
- a salt; and
- water qs to 100%; and
- a pH in the range of from about 5.5 to about 8.0.

In some embodiments, the invention described herein is a formulation that includes:
- a suspension of 4-(7-Hydroxy-2-isopropyl-4-oxo-4H-quinazolin-3-yl)-benzonitrile (compound I) in crystal form K', crystal form M, crystal form Q, Hydrate $H_B$, or combinations thereof, in an amount of about 0.5% w/v, about 1.0% w/v, about 1.5% w/v, about 2.0% w/v, or about 2.5% w/v,
- a non-ionic surfactant selected from tyloxapol in an amount of about 0.04 w/v to about 0.06% w/v, poloxamer in an amount of about 0.005-0.12% w/v, or combinations thereof;
- a suspending agent selected from hydroxypropyl methyl cellulose in an amount of from about 0.1% w/v to about 0.8 w/v %, polyethylene glycol in an amount of from about 2% w/v to about 8% w/v, carbomer homopolymer Type B in an amount from about 0.05% w/v to about 0.5% w/v, or combinations thereof;

a tonicity agent selected from mannitol or glycerin in an amount of from about 0.1% w/v to about 5% w/v;

a buffer selected from edetate, phosphate, borate, tromethamine, or combinations thereof;

sodium chloride in an amount of from 0.01% w/v to about 1% w/v;

water qs to 100% and a pH in the range of from about 5.5 to about 8.0.

In some embodiments, the invention described herein is a formulation that includes:

a suspension of 4-(7-Hydroxy-2-isopropyl-4-oxo-4H-quinazolin-3-yl)-benzonitrile (compound I) in crystal form K', crystal form M, crystal form Q, Hydrate $H_B$, or combinations thereof, in an amount of about 0.5% w/v, about 1.0% w/v, about 1.5% w/v, about 2.0% w/v, or about 2.5% w/v, tyloxapol in an amount of about 0.04 w/v to about 0.06% w/v;

carbomer homopolymer Type B in an amount from about 0.05% w/v to about 0.4% w/v;

glycerin in an amount of from about 0.5% w/v to about 5% w/v;

a buffer selected from edetate, phosphate, borate, tomethamine, or combinations thereof;

sodium chloride in an amount of from 0.01% w/v to about 1% w/v;

water qs to 100% and a pH in the range of from about 5.5 to about 8.0.

In some embodiments, acids or bases such as hydrochloric acid, sodium hydroxide, or combinations thereof are used to adjust pH of the formulation. In particular embodiments, hydrochloric acid is used to adjust pH to about 6.0, or about 7.4.

In some embodiments, the formulations described herein are aqueous, that is, they include at least about 90%, at least about 92%, or at least about 95% water.

In some embodiments, the formulations described herein further include additional components. In particular embodiments, the formulation includes a cyclodextrin derivative, for example, β-cyclodextrin derivative, γ-cyclodextrin derivative or a combination thereof. In particular embodiments, the cyclodextrin is a hydroxypropyl β-cyclodextrin or sulfoalkylether β-cyclodextrin. When present, the cyclodextrin derivative may be present in an amount of at least about 1.5 w/v %, at least about 3.0 w/v %, at least about 3.5 w/v % or at least about 4.5 w/v, but no greater than about 10.0 w/v %, no greater than about 8.0% w/v, no greater than about 6.5 w/v %, or no greater than about 5.5 w/v. In particular embodiments, the formulation includes about 5% w/v of either hydroxypropyl β-cyclodextrin or sulfoalkylether β-cyclodextrin.

In some embodiments, the formulations of the invention may include an additional therapeutic agent in addition to compound I. Further therapeutic agents may include, for instance, other compounds and antibodies useful for treating ocular surface disorders. A non-limiting list of such agents incudes nonsteroidal anti-inflammatory drugs such as ketorolac, nepafenac, bromfenac, corticosteroids; drugs for dry eye disease such as cyclosprine, lifitegrast, or other TRPV1 inhibitors. In particular embodiments, the additional therapeutic agent is an ophthalmic steroid such as dexamethasone, fluocinolone, loteprednol, difluprednate, fluorometholone, prednisolone, prednisone, medrysone, triamcinolone, betamethasone, rimexolone, or pharmaceutically acceptable salts thereof. Further non-limiting examples of such additional therapeutic agents that may be included in the pharmaceutical composition include Xiidra® (lifitegrast), Restasis® (cyclosporine), minocycline, doxycycline, or other tetracycline antibiotics. Other examples include keratolytic agents such as selenium disulfide, salicylic acid, glycolic acid etc., or pharmaceutically acceptable salts thereof.

In some embodiments, the formulation is stored at refrigerated temperatures (e.g., 4° C.). In some embodiments, the formulation is warmed to room temperature prior to administration.

In some embodiments, the suspension is packaged in a single dose container. In some embodiments, the formulation is packaged in a multi-dose container.

The formulations described herein are delivered to the surface of the eye one to six times a day, depending on the routine discretion of the skilled clinician. In some embodiments, the formulations are administered, one, two, three, or four times a day.

In some embodiments, the pharmaceutical formulations of the invention may include an additional therapeutic agent in addition to Compound (I). Further therapeutic agents may include, for instance, other compounds and antibodies useful for treating ocular surface disorders. A non-limiting list of such agents incudes nonsteroidal anti-inflammatory drugs such as ketorolac, nepafenac, bromfenac, corticosteroids; drugs for dry eye disease such as cyclosporine, lifitegrast, or other TRPV1 inhibitors. In particular embodiments, the additional therapeutic agent is an ophthalmic steroid such as dexamethasone, fluocinolone, loteprednol, difluprednate, fluorometholone, prednisolone, prednisone, medrysone, triamcinolone, betamethasone, rimexolone, or pharmaceutically acceptable salts thereof. Further non-limiting examples of such additional therapeutic agents that may be included in the pharmaceutical composition include Xiidra® (lifitegrast), Restasis® (cyclosporine), minocycline, doxycycline, or other tetracycline antibiotics. Other examples include keratolytic agents such as selenium disulfide, salicylic acid, glycolic acid etc., or pharmaceutically acceptable salts thereof.

Methods of Making

In some embodiments, the formulation is prepared by mixing an amount of 4-(7-hydroxy-2-isopropyl-4-oxo-4H-quinazolin-3-yl)-benzonitrile (compound I) or a salt, co-crystal, or polymorph thereof, and one or more excipients selected from the group consisting of a surfactant, a suspending agent, a tonicity agent, a buffer, a preservative, a salt, and a preservative.

In some embodiments, the present invention provides a method of making the pharmaceutical formulations of compound I. In some embodiments, the formulation is prepared by mixing an amount of 4-(7-Hydroxy-2-isopropyl-4-oxo-4H-quinazolin-3-yl)-benzonitrile (compound I) or a salt, co-crystal, or polymorph thereof, a non-ionic surfactant;

a suspending agent;

a tonicity agent;

a buffer;

a salt;

optionally, a preservative; and water qs to 100%, and adjusting the pH to a range of from about 5.5 to about 8.0.

Methods of Use

Without being bound by theory, it is hypothesized that blockers of the Transient Receptor Potential Vanilloid 1 (TRPV1) receptor may be useful in the treatment of pain, e.g., chronic pain.

Accordingly, in some embodiments, the invention provides a method of treating ocular surface pain in a subject, said method includes administering to the subject an effective amount of compound (I), or a pharmaceutically acceptable salt, solvate, or co-crystal thereof. In some embodiments, the invention provides a method of reducing ocular surface pain in a subject in need thereof, said method includes administering to the subject an effective amount of compound (I), or a pharmaceutically acceptable salt, solvate, or co-crystal thereof. In some embodiments, the invention provides for the use of the compound of formula I, or a pharmaceutically acceptable salt, solvate, or co-crystal thereof, in the treatment or reduction of ocular surface pain. In some embodiments, the compound of formula I is in polymorphic form B. In particular embodiments, the methods described herein are carried out by administering the formulations of compound I described supra. Thus, the invention provides a method of treating ocular surface pain by administering a formulation of compound I as described herein. In some embodiments, the method results in a reduction in ocular surface pain.

In some embodiments, the subject suffers from episodic or acute ocular pain. In some embodiments, the subject suffers from chronic ocular surface pain, which lasts for at least three months. In some embodiments, the subject suffers from chronic ocular surface pain, which lasts for at least two months. In some embodiments, the subject suffers from chronic ocular surface pain, which lasts for at least one month. In some embodiments, the subject suffers from chronic ocular surface pain, which lasts for at least four months. In some embodiments, the subject suffers from chronic ocular surface pain, which lasts for at least five months. Thus, in some embodiments, the invention provides a method of treating chronic ocular surface pain in a subject by administering to the subject an effective amount of compound of formula I, or a salt, solvate, polymorph, or co-crystal thereof. In some embodiments, the invention provides a method of reducing chronic ocular surface pain in a subject by administering to the subject an effective amount of compound of formula I, or a salt, solvate, polymorph, or co-crystal thereof. The invention provides for the use of the compound of formula I, or a pharmaceutically acceptable salt, solvate, polymorph, or co-crystal thereof, in the treatment of chronic ocular surface pain. In some embodiments, the compound of formula I is in a formulation as described herein.

In some embodiments, the formulation is administered to the ocular surface of the subject, e.g., any part of the cornea, conjunctiva, or to the cul de sac of the eye.

In some embodiments, the invention provides for the administration of the compound of formula I to a subject in need thereof in a ophthalmically compatible formulation at a concentration of about 0.5% w/v to about 3.5% w/v. In some embodiments, concentrations for administration range from about 0.5% to about 3.5% w/v, about 0.5% to about 2.5% w/v, about 0.5% to about 1.5% w/v, about 0.5% to about 3.0% w/v, about 1.0% to about 2.5% w/v, about 1.5% to about 3.0% w/v, about 0.5% to about 2.5% w/v. In some embodiments, the concentration of the compound I in an ophthalmically compatible formulation is at least about 0.5% w/v, at least about 1.0% w/v, at least about 1.5% w/v, at least about 2.0% w/v, or at least about 2.5% w/v. In some embodiments, the concentration of the compound of formula I in a formulation for topical use is no more than about 5.0% w/v, no more than about 4.5% w/v, no more than about 4.0% w/v, no more than about 3.5% w/v, or no more than about 3.0% w/v. In particular embodiments, the concentration of the compound of formula I in a formulation for topical use is about 0.5% w/v, about 1.0% w/v, about 1.5% w/v, about 2.0% w/v, about 2.5% w/v, about 3.0% w/v, or about 3.5% w/v. In some embodiments, the dose per administration per eye is from about 0.15 to about 1.15 mg, or about 0.15 mg, 0.2 mg, about 0.25 mg, about 0.3 mg, about 0.35 mg, about 0.4 mg, about 0.45 mg, about 0.5 mg, about 0.55 mg, about 0.6 mg, about 0.65 mg, about 0.7 mg, about 0.75 mg, about 0.8 mg, about 0.85 mg, about 0.9 mg, about 0.95 mg, about 1.0 mg, about 1.05 mg, about 1.1 mg, or about 1.15 mg. In some embodiments, the dose per administration per eye is about 0.18 mg, about 0.37 mg, about 0.55 mg, about 0.74 mg, or about 0.92 mg. In some embodiments, the total daily dose per eye is about 0.5 to about 3.5 mg, or about 0.5 mg, about 1.0 mg, about 1.5 mg, about 2.0 mg, about 2.5 mg, about 3.0 mg, or about 3.5 mg. In some embodiments, the compound of formula I is administered to the subject one to six times a day, e.g., one, two, three, or four times a day. In some embodiments, the compound of formula I is administered to the subject for a period of at least about one month, at least about two months, or at least about three months. In some embodiments, the compound of formula I is administered to the subject for a period of at least about 12 weeks.

In some embodiments, the ocular surface pain or the chronic ocular surface pain is associated with one or more of dry eye disease, Sjogren's Syndrome, conjunctivitis (including keratoconjuctivitis, vernal keratoconjunctivitis, allergic conjunctivitis), Map-Dot-Fingerprint Dystrophy, acanthamoeba, fibromyalgia, Meibomian gland dysfunction, thyroid eye disease, rosacea, ptosis, keratoconus, ocular pain syndrome, Steven-Johnson's syndrome, corneal epitheliopathies, corneal neuropathies (including LASIK induced corneal neuropathies), corneal dystrophies (including recurrent corneal dystrophies), epithelial basement membrane dystrophy, corneal erosions or abrasions (including recurrent corneal erosions or abrasions), ocular surface diseases, blepharitis, graft vs host disease, meibomitis, glaucoma, conjunctivochalasis, keratopathis (including herpetic keratopathy, filamentary keratopathy, band or bullous keratopathy, exposure keratopathy), keratitis (including herpes simplex virus keratitis), iritis, episclentis, corneal surgery, multiple sclerosis, trichiasis, pterygium, neuralgia, xerophthalmia, or patients recovering from neurotrophic keratitis. In some embodiments of the methods described herein, the subject suffers from ocular pain persisting for at least three months after photorefractive keratectomy (PRK) surgery or laser-assisted in situ keratomileusis (LASIK) surgery.

In particular embodiments, the ocular surface pain or the chronic ocular surface pain is associated with dry eye disease or Sjogren's Syndrome. In some embodiments, the subject suffers from conjunctivitis, subconjunctival hemorrhage, subconjunctival scarring, conjunctival membranes, conjunctival ulceration, superficial punctate epithelial erosions, epithelial defects, lid margin ulceration, lid margin keratinization, symblepharon, ankyloblepharon, trichiasis, anterior blepharitis, punctal auto-occlusion, meibomian gland disease, corneal opacification, dry eye, districhiasis, limbal stem cell failure, or corneal vascularization.

In some embodiments, the administration of compound of formula I results in a reduction in the subject's ocular pain, compared to a placebo. In some embodiments, the reduction in the subjects ocular pain is at least about 3 when measured on the VAS score, compared to a placebo. In some embodiments, the administration results in a reduction in the subject's ocular pain of at least about 4, at least about 5, at least about 6, at least about 7, at least about 8, at least about 9, or at least about 10, when measured on the VAS score, compared to a placebo. In some embodiments, the administration results in a reduction in the subject's pain of at least about 10%, at least about 15%, at least about 20%, or at least about 25%, compared to a placebo.

In some embodiments, the administration of the compound of formula I results in a reduction in the subject's pain of at least about 2 compared to a placebo, as measured by the VAS score, about half hour after the administration, about one hour, about 2 hours, or about 2-4 hours after the administration. In some embodiments, the administration results in a reduction in the subject's pain, when measured after 7 days of administration of the compound of formula I. In some embodiments, the administration results in a reduction in the subject's pain, when measured after 14 days of administration of the compound of formula I.

In some embodiments, the reduction in pain score arises from the difference in pain scores prior to and after administration of compound I to the subject. In some embodiments, the reduction in pain score as measured by the VAS, arises from the difference in pain scores prior to and after administration of compound I to the subject. In some embodiments, the reduction in pain score occurs within about half hour after administration of compound I to the subject. In some embodiments, the reduction in pain score occurs within about 1 hour, about 2 hours, about 3 hours, about 4 hours, about 5 hours, or about 6 hours after administration of compound I to the subject. In some embodiments, the administration results in a reduction in the subject's pain, when measured after 7 days of administration of the compound of formula I. In some embodiments, the administration results in a reduction in the subject's pain, when measured after 14 days of administration of the compound of formula I.

In some embodiments, the administration of the compound of formula I results in an improved score on at least one question of the OPAS of at least about 10%, at least about 20%, or at least about 30%.

In some embodiments, the administration of the compound of formula I results in an improved score on at least one question of the Visual Tasking Questionnaire of at least about 10%, at least about 20%, or at least about 30%.

In some embodiments, the administration of the compound of formula I results in reduced ocular hyperemia (redness of the eye), compared to placebo. In particular embodiments, the administration of the compound of formula I results in reduced grade 1, grade 2, grade 3, or grade 4 hyperemia compared to placebo.

In some embodiments, the administration results in a reduction in ocular hyperemia score of at least about 1, at least about 2, at least about 3, at least about 4, or at least about 5, on the McMonnies scale.

Thus, in some embodiments, the present invention relates to a method of treating or reducing ocular hyperemia in a subject in need thereof, comprising administering to the subject an effective amount of compound of formula I, or a salt, solvate, polymorph, or co-crystal thereof. In some embodiments, the invention provides for the use of the compound of formula I, or a pharmaceutically acceptable salt, solvate, or co-crystal thereof, in the treatment of ocular hyperemia. In some embodiments, the administration results in a reduction in ocular hyperemia score of at least about 1, at least about 2, at least about 3, at least about 4, or at least about 5, on the McMonnies scale. In some embodiments, the invention provides for the administration of the compound of formula I to a subject in need thereof in a ophthalmically compatible formulation at a concentration of about 0.5% w/v to about 3.5% w/v. In some embodiments, concentrations for administration range from about 0.5% to about 3.5% w/v, about 0.5% to about 2.5% w/v, about 0.5% to about 1.5% w/v, about 0.5% to about 3.0% w/v, about 1.0% to about 2.5% w/v, about 1.5% to about 3.0% w/v, about 0.5% to about 2.5% w/v. In particular embodiments, the concentration of the compound of formula I in a formulation for topical use is about 0.5% w/v, about 1.0% w/v, about 1.5% w/v, about 2.0% w/v, about 2.5% w/v, about 3.0% w/v, or about 3.5% w/v. In some embodiments, the dose per administration per eye is from about 0.15 to about 1.15 mg, or about 0.15 mg, 0.2 mg, about 0.25 mg, 0.3 mg, about 0.35 mg, about 0.4 mg, about 0.45 mg, about 0.5 mg, about 0.55 mg, about 0.6 mg, about 0.65 mg, about 0.7 mg, about 0.75 mg, about 0.8 mg, about 0.85 mg, about 0.9 mg, about 0.95 mg, about 1.0 mg, about 1.05 mg, about 1.1 mg, or about 1.15 mg. In some embodiments, the dose per administration per eye is about 0.18 mg, about 0.37 mg, about 0.55 mg, about 0.74 mg, or about 0.92 mg. In some embodiments, the total daily dose per eye is about 0.5 to about 3.5 mg, or about 0.5 mg, about 1.0 mg, about 1.5 mg, about 2.0 mg, about 2.5 mg, about 3.0 mg, or about 3.5 mg. In some embodiments, the compound of formula I is administered to the subject one to six times a day, e.g., one, two, three, or four times a day. In some embodiments, the compound of formula I is administered to the subject for a period of at least about one month, at least about two months, or at least about three months. In particular embodiments, the compound of formula I is administered in a formulation described herein.

In some embodiments, the ocular hyperemia is associated with one or more of dry eye disease, Sjogren's Syndrome, conjunctivitis (including keratoconjuctivitis, vernal keratoconjunctivitis, allergic conjunctivitis), Map-Dot-Fingerprint Dystrophy, acanthamoeba, fibromyalgia, Meibomian gland dysfunction, thyroid eye disease, rosacea, ptosis, keratoconus, ocular pain syndrome, Steven-Johnson's syndrome, corneal epitheliopathies, corneal neuropathies (including LASIK induced corneal neuropathies), corneal dystrophies (including recurrent corneal dystrophies), epithelial basement membrane dystrophy, corneal erosions or abrasions (including recurrent corneal erosions or abrasions), ocular surface diseases, blepharitis, graft vs host disease, meibomitis, glaucoma, conjunctivochalasis, keratopathis (including herpetic keratopathy, filamentary keratopathy, band or bullous keratopathy, exposure keratopathy), keratitis (including herpes simplex virus keratitis), iritis, episclentis, corneal surgery, multiple sclerosis, trichiasis, pterygium, neuralgia, xerophthalmia, or patients recovering from neurotrophic keratitis. In some embodiments of the methods described herein, the ocular hyperemia persists for at least three months after photorefractive keratectomy (PRK) surgery or laser-assisted in situ keratomileusis (LASIK) surgery.

In some embodiments, the ocular surface pain or chronic ocular surface pain is associated with dry eye disease. In some embodiments, the administration of the compound of formula I results in a decrease in the symptoms of dry eye disease. Dry eye disease is generally understood to be a complex, multifactorial condition characterized by inflammation of the ocular surface and lacrimal glands and reductions in the quality and/or quantity of tears. It is believed that up to 30% of dry eye disease patients suffer from ocular surface pain that may be chronic. Thus, in some embodiments, the invention results in a decrease of at least about 10%, at least about 15%, at least about 20%, or at least about 30% in the symptoms of dry eye disease, including one or more of ocular dryness, ocular discomfort, ocular hyperemia, ocular burning or stinging, grittiness or foreign body sensation, or photophobia.

In some embodiments, the invention relates to a method of treating dry eye disease in a subject in need thereof, comprising administering to the subject an effective amount of compound of formula I, or a salt, solvate, polymorph, or co-crystal thereof. In some embodiments, the invention relates to a method of treating dry eye disease in a subject in need thereof, comprising administering to the subject an effective amount of compound of formula I, or a salt, solvate, polymorph, or co-crystal thereof, wherein the compound of formulat I is safe for administration over a period of at least 2 months, at least 3 months, at least 4 months, or at least 5 months. In particular embodiments, the invention provides for the use of the compound of formula I, or a pharmaceutically acceptable salt, solvate, or co-crystal thereof, in the treatment of dry eye disease. In some embodiments, the invention results in a decrease of at least about 10% in the symptoms of dry eye disease, including one or more of ocular dryness, ocular discomfort, ocular hyperemia, ocular burning or stinging, grittiness or foreign body sensation, or photophobia. In some embodiments, the invention provides for the administration of the compound of formula I to a subject in need thereof in a ophthalmically compatible formulation at a concentration of about 0.5% w/v to about 3.5% w/v. In some embodiments, concentrations for administration range from about 0.5% to about 3.5% w/v, about 0.5% to about 2.5% w/v, about 0.5% to about 1.5% w/v, about 0.5% to about 3.0% w/v, about 1.0% to about 2.5% w/v, about 1.5% to about 3.0% w/v, about 0.5% to about 2.5% w/v. In particular embodiments, the concentration of the compound of formula I in a formulation for topical use is about 0.5% w/v, about 1.0% w/v, about 1.5% w/v, about 2.0% w/v, about 2.5% w/v, about 3.0% w/v, or about 3.5% w/v. In some embodiments, the dose per administration per eye is from about 0.15 to about 1.15 mg, or about 0.15 mg, 0.2 mg, about 0.25 mg, 0.3 mg, about 0.35 mg, about 0.4 mg, about 0.45 mg, about 0.5 mg, about 0.55 mg, about 0.6 mg, about 0.65 mg, about 0.7 mg, about 0.75 mg, about 0.8 mg, about 0.85 mg, about 0.9 mg, about 0.95 mg, about 1.0 mg, about 1.05 mg, about 1.1 mg, or about 1.15 mg. In some embodiments, the dose per administration per eye is about 0.18 mg, about 0.37 mg, about 0.55 mg, about 0.74 mg, or about 0.92 mg. In some embodiments, the total daily dose per eye is about 0.5 to about 3.5 mg, or about 0.5 mg, about 1.0 mg, about 1.5 mg, about 2.0 mg, about 2.5 mg, about 3.0 mg, or about 3.5 mg. In some embodiments, the compound of formula I is administered to the subject one to six times a day, e.g., one, two, three, or four times a day. In some embodiments, the compound of formula I is administered to the subject for a period of at least about one month, at least about two months, or at least about three months. In some embodiments, the compound of formula I is administered as a formulation described herein.

In some embodiments of the methods described herein, the administration of the compound of formula I does not result in a change (e.g., of less than 5% difference, less than 4% difference, or less than 3% difference) in one or more of best corrected visual acuity, slit-lamp biomicroscopy, dilated eye exam, blink rate, tear production, intraocular pressure or corneal staining, compared to a placebo. In some embodiments of the methods described herein, the administration of compound of formula I does not result in a delay in wound healing compared to a placebo in a patient in need thereof.

Patient Population

In specific embodiments, a subject to be treated by methods provided herein suffers from an ocular surface disorder. Non-limiting examples of ocular surface disorders include chronic ocular surface pain (COSP), dry eye disease, Sjogren's Syndrome, conjunctivitis (including keratoconjuctivitis, vernal keratoconjunctivitis, allergic conjunctivitis), Map-Dot-Fingerprint Dystrophy, acanthamoeba, fibromyalgia, Meibomian gland dysfunction, thyroid eye disease, rosacea, ptosis, keratoconus, ocular pain syndrome, Steven-Johnson's syndrome, corneal epitheliopathies, corneal neuropathies (including LASIK induced corneal neuropathies), corneal dystrophies (including recurrent corneal dystrophies), epithelial basement membrane dystrophy, corneal erosions or abrasions (including recurrent corneal erosions or abrasions), ocular surface diseases, blepharitis, graft vs host disease, meibomitis, glaucoma, conjunctivochalasis, keratopathis (including herpetic keratopathy, filamentary keratopathy, band or bullous keratopathy, exposure keratopathy), keratitis (including herpes simplex virus keratitis), iritis, episclentis, corneal surgery, multiple sclerosis, trichiasis, pterygium, neuralgia, xerophthalmia, or patients recovering from neurotrophic keratitis. In some embodiments, the subject suffers from ocular pain persisting for at least three months after photorefractive keratectomy (PRK) surgery or laser-assisted in situ keratomileusis (LASIK) surgery.

In certain embodiments, methods provided herein is for treating, or reducing, ocular surface pain, such as acute ocular surface pain.

In certain embodiments, methods provided herein is for treating, or reducing, ocular surface pain, such as chronic ocular surface pain (COSP). In particular aspects, COSP is characterized as persistent ocular surface pain (e.g., persistent severe ocular surface pain) that can distract from, or can interfere with, regular daily activities. In specific aspects, COSP can result in poor quality of life, and can persist for at least 1 month, at least 2 months, at least 3 months, at least 4 months, at least 5 months, or at least 6 months. In some aspects, COSP can persist for at least about 2 months or at least about 3 months. In other aspects, COSP can persist for at least 3 months or at least 4 months. In particular aspects, subject with COSP remain symptomatic despite adherence to other therapies indicated for their underlying disease (e.g., an ocular surface disorder such as dry eye disease or Sjogren's Syndrome).

In some embodiments, the subject to be treated suffers from ocular neuropathic pain (ONP). ONP is a spectrum of disorders of ocular pain that may be caused by damage or disease affecting the nerves, e.g., corneal nerves. Symptoms of ONP may include one or more of eye pain, sensitivity to light, hyperalgesia or dysesthesia (abnormal sensations) such as a sensation of dryness, stinging, or foreign body, pain from normally non-painful stimuli (allodynia). Gabapentin and other neuropathic pain medications may be used to blunt sensory nerve stimulation or the perception of nerve stimulation.

In some embodiments, the subject to be treated suffers from exposure keratopathy. EK is damage to the cornea that occurs primarily from prolonged exposure of the ocular surface to the outside environment. EK can lead to ulceration, microbial keratitis, and permanent vision loss from scarring. Patients at risk for EK include those who suffer from conditions that interfere with the ability to protect the cornea; either by incomplete eyelid closure (e.g., lagophthalmos, proptosis, lid malposition), inadequate blink reflex, inadequate blink rate (for example, caused by a neurologic disease, e.g., Parkinson disease, a neuromuscular disease)

and/or decreased protective lubrication of the cornea. Symptoms of EK include foreign body sensation, burning, increased tearing, and intermittent blurry vision (from an unstable tear film), pain and photophobia. Standard treatments include the use of frequent artificial tears with nightly lubricating ointment, punctal plugs.

In some embodiments, the subject to be treated suffers from keratoconjunctivitis. Keratoconjuctivitis is an inflammatory process that involves both the conjunctiva and the cornea. Superficial inflammation of the cornea (keratitis) occurs commonly in association with viral and bacterial conjunctivitis, for example in adults. The following types of keratoconjuctivitis are distinguished based on the potential cause of inflammation:
  Keratoconjunctivitis sicca is cause by the inflammation due to dryness;
  Vernal keratoconjunctivitis (VKC) occurs seasonally, considered to be due to allergens;
  Atopic keratoconjunctivitis is one manifestation of atopy;
  Epidemic keratoconjunctivitis or adenoviral keratoconjunctivitis is caused by an adenovirus infection;
  Infectious bovine keratoconjunctivitis (IBK) is a disease affecting cattle caused by the bacteria *Moraxella bovis*;
  Pink eye in sheep and goat is mostly caused by *Chlamydophila pecorum*;
  Superior limbic keratoconjunctivitis is thought to be caused by mechanical trauma;
  Keratoconjunctivitis photoelectrica (arc eye) means inflammation caused by photoelectric UV light.

In some embodiments, the subject to be treated suffers from dry eye. The term "dry eye" as used herein, refers to inadequate tear production and/or abnormal tear composition. Dry eye syndrome disease (DEDS), also known as dry eye syndrome, keratoconjunctivitis sicca or keratitis sicca, or tear dysfunction syndrome, or burning eye syndrome results from deficiency of any of the tear film layers. Dry eye is a multifactorial disease of the tears and ocular surface that results in symptoms of discomfort, visual disturbance, and tear-film instability with potential damage to the ocular surfaceocular surface characterized by loss of homeostasis of the tear film, and accompanied by ocular symptoms, in which tear film instability and hyperosmolarity, ocular surface inflammatoin and damage, and neuro-sensory abnormalities play etiological roles (Craig J P, et al., *The Ocular Surface* 2017; 15:276-83). It may be accompanied by increased osmolarity of the tear film and inflammation of the ocular surface. Dry eye disorder may range from mild to moderate to severe forms. Symptoms of dry eye syndrome disease include gritty, foreign body sensations, burning, photophobia, and decreased visual acuity, tearing, stinging, itching, sandy or gritty feeling, discharge, frequent blinking, mattering or caking of the eyelashes (usually worse upon waking), redness, blurry or fluctuating vision (made worse when reading, computer, watching television, driving, or playing video games), light-sensitivity, eye pain and/or headache, heavy eye lids, eye fatigue. Causes of dry eye disease include, but are not limited to, the following: idiopathic, congenital alacrima, xerophthalmia, lacrimal gland ablation, and sensory denervation; collagen vascular diseases, including rheumatoid arthritis, Wegener's granulomatosis, and systemic lupus erythematosus; Sjogren's Syndrome and autoimmune diseases associated with Sjogren's syndrome; abnormalities of the lipid tear layer caused by blepharitis or rosacea; abnormalities of the mucin tear layer caused by vitamin A deficiency; trachoma, diphtheric keratoconjunctivitis; mucocutaneous disorders; aging; menopause; and diabetes. Dry eye signs and/or symptoms as defined herein may also be provoked by other circumstances, including but not limited to the following: prolonged visual tasking; working on a computer; being in a dry environment; warm or cold wind or air flow; seasonal changes; ocular irritation; contact lenses, LASIK and other refractive surgeries; fatigue; and medications such as isotretinoin, sedatives, diuretics, tricyclic antidepressants, antihypertensives, oral contraceptives, antihistamines, nasal decongestants, beta-blockers, phenothiazines, atropine, and pain relieving opiates such as morphine.

Diagnostic testing for dry eye includes evaluation of cornea sensation (corneal hyperesthesia and/or reduced sensation may be present in severe and chronic dry eye disease) using, for example, a cotton tip applicator or more precisely with a Cochet-Bonnet esthesiometer; measuring tear break up time using, for example, a fluorescein-impregnated strip wet with non-preserved saline solution or more objective computerized methods without the need for fluorescein instillation; performing oculr surface staining, e.g., fluorescein sodium, rose bengal, lissamine green; performing Schirmer test (relatively insensitive for patients with mild dry eye), testing delayed tear clearance; tear meniscus height; measuring level of MMP-9 (MMP-9 has been shown to be elevated in the tears of patient with dry eye disease, and levels correlate with examination findings in patients with moderate to severe dry eye); measuring tear osmolarity and tear film interferometry; performing Sjo test (detection of SS-A (anti-Ro) and SS-B (anti-La) autoantibodies in serum, salivary gland protein 1 (SP-1), carbonic anhydrase 6 (CA6), and parotid secretory protein (PSP). SP-1, CA6, and PSP).

Artificial tears, lubricating ointments, corticosteroids (e.g., loteprednol 0.5% eyedrops four times a day) are used as an initial treatment. Prescription medicines include cyclosporine, lifitegrast, diquafosol, rebamepide, corticosteroids (e.g., loteprednol 0.5% eyedrops four times a day).

The term "tear film dysfunction" refers to a state when the tear film breaks down in different places on the cornea and conjunctiva, leading not only to symptoms of irritation, but also to unstable and intermittently changing vision. For example, dry eye syndrome disease is characterized by tear film dysfunction. The symptoms of tear film dysfunction include tearing, burning, stinging, itching, sandy or gritty feeling, scratchy or foreign-body sensation, discharge, frequent blinking, mattering or caking of the eyelashes (usually worse upon waking), redness, blurry or fluctuating vision (made worse when reading, computer, watching television, driving, or playing video games), light-sensitivity, eye pain and/or headache, heavy eye lids, eye fatigue.

Adenoviral keratoconjunctivitis, also known as Keratoconjunctivitis epidemica is a common and highly contagious viral infection of the eye. The clinical course of Adenoviral keratoconjunctivitis is divided into an acute phase with conjunctival inflammation of varying intensity with or without corneal involvement and a chronic phase with corneal opacities.

Vernal keratoconjunctivitis (VKC) is an atopic condition of the external ocular surface characterized by symptoms consisting of severe itching, photophobia, foreign body sensation, mucous discharge (often described as "ropy"), blepharospasm, and blurring of vision (Buckley, R J, *Int Ophthalmol Clin*, 1988 28(4): p. 303-8; Kumar, S., *Acta Ophthalmologica*, 2009. 87(2): p. 133-147). It is typically bilateral but may be asymmetric in nature. It characteristically affects young males in hot dry climates in a seasonal manner; in 23% of patients may have a perennial form (Kumar, S., *Acta Ophthalmologica*, 2009. 87(2): p. 133-147; Bonini, S., et al., *Ophthalmology*, 2000. 107(6): p. 1157-63).

The signs of VKC can be divided into conjunctival, limbal and corneal signs:
  Conjunctival signs include diffuse conjunctival injection and upper tarsal giant papillae that are discrete >1 mm in diameter;
  Limbal signs include thickening and opacification of the limbal conjunctiva as well as gelatinous appearing and sometime confluent limbal papillae. Peri-limbal Horner-Trantas dots are focal white limbal dots consisting of degenerated epithelial cells and eosinophils (Buckley, R. J., *Int Ophthalmol Clin,* 1988. 28(4): p. 303-8);
  Corneal signs vary according to the severity of the disease process and include macro-erosions, cornal ulcers and scars (Buckley, R. J., *Int Ophthalmol Clin,* 1988. 28(4): p. 303-8).

Active VKC patients (defined as moderate to severe ocular discomfort including photophobia, papillae on the upper tarsal conjunctiva, or limbal Horner-Trantas dots clearly recognizable at the time of the examination) showed significantly increased symptoms and signs of ocular surface disease. Inactive VKC patients (defined as no symptoms or mild discomfort, and absence of corneal abnormalities at the time of the examination) showed increased photophobia, conjunctival lissamine green staining and Schirmer test values, and reduced fluorescein break-up time (BUT) and corneal sensitivity. This syndrome seems to affect the ocular surface in all phases (active and quiescent), determining abnormalities in tear film stability, epithelial cells integrity, and corneal nerves function (Villani E. et al., *Medicine* (Baltimore). 2015 October; 94(42): e1648).

The following factors are thought to play a role in VKC:IgE mediate reaction via mast cell release; activated eosinophils, mononuclear cells and neutrophils as well as the CD4 T-helper-2 driven type IV hypersensitivity with immunomodulators such as IL-4, IL-5, and bFGF (Buckley, R. J., *Int Ophthalmol Clin,* 1988. 28(4): p. 303-8; Kumar, S., *Acta Ophthalmologica,* 2009. 87(2): p. 133-147; La Rosa, M., et al., *Ital J Pediatr,* 2013. 39: p. 18).

Treatment consists of cool compresses and lid scrubs, saline eyedrops, which may help to relieve symptoms, along with topical antihistamines, nonsteroidal anti-inflammatory drugs or corticosteroids, e.g., low-absorptions corticosteroids (fluorometholone, loteprednol, remexolone, etc.), opical mast cell stabilizers (cromolyn sodium, nedocromil sodium, and lodoxamide), topical cyclosporin-A, or tacrolimus. See e.g., Oray, M. and E. Toker, *Cornea,* 2013. 32(8): p. 1149-54: Vichyanond, P. and P. Kosrirukvongs, *Curr Allergy Asthma Rep,* 2013. 13(3): p. 308-14; Barot, R K et al., *J Clin Diagn Res.* 2016 June; 10(6):NC05-9; Wan Q et al., *Ophthalmic Res.* 2018; 59(3):126-134.

Atopic keratoconjunctivitis (AKC) typically has an older age of onset in the 2nd to 5th decade, as opposed to onset prior to age 10 with VKC. Conjunctival involvement is classically on the upper tarsus in VKC and on the lower tarsus in AKC. AKC is typically more chronic in nature and more commonly results in scarring of the cornea and conjunctival cicatrization.

Sjogren's Syndrome (Sjogren's syndrome associated with dry eye) is a chronic inflammatory disorder characterized by exocrine gland dysfunction including the salivary and lacrimal glands that in many cases results in a severe dry eye. Primary symptoms are dry eyes (keratitis sicca or keratoconjunctivitis sicca) and dry mouth (xerostomia). Severe dry eyes can cause corneal pain, corneal scarring, ulceration, infection, and even perforation. The differential diagnosis includes conditions such as adult blepharitis, dry eye disease, and juvenile idiopathic arthritis uveitis, as well keratopathies, e.g., superficial punctate, filamentary, neurotrophic, exposure). Treatment of Sjogren's syndrome is aimed at maintaining the integrity of the tear film through preservation, augmentation, and/or replacement of the deficient tear secretion. Treatment of Sjogren's syndrome thus includes artificial tears and lubricating ointments; autologous serum eyedrops; oral omega-6 essential fatty acids; fluid-ventilated, gas permeable scleral lenses; topical corticosteroids; punctal occlusion to decrease tear drainage; a small lateral tarsorrhaphy; humidification of the environment; hydrophilic bandage lenses; bromhexine and 3-isobutyl 1-methylxanthine (IBMX) (augmentation of tear production/secretion); agents to stimulate muscarinic receptors (pilocarpine and cevimeline); immunosuppressive agents, e.g., methotrexate, antimalarials, cyclophosphamide, leflunomide, or tumor necrosis factor (TNF), e.g., infliximab, a monoclonal antibody to TNF-alpha; Cyclosporin A; the bandage contact lens.

Steven-Johnson's syndrome (SJS) is a dermatologic emergency or a type of severe skin reaction characterized by the presence of epidermal and mucosal bullous lesions involving less than 10% of the total body surface area. Early symptoms of SJS include fever and flu-like symptoms, which may precede or occur concurrently with the development of a macular rash involving the trunk and face. As the disease progresses, the macular rash coalesces, the involved areas develop bullae, and the epidermal layer eventually sloughs off. During the acute phase of SJS-TEN, 80% of patients will have ocular involvement.

The constellation of high fever (>102.2), malaise, arthralgia, a macular rash involving the trunk, neck and face, and recent history of new medication exposure or recently increased dosage of an existing medication are indicators used for diagnosis of SJS. A skin biopsy of an effected area can be performed for a confirmation of the diagnosis. Granulysin can be used as a marker for the diagnosis of SJS. The concentration of granulysin within bullous fluid correlates with the severity of the acute phase of SJS (Chung W H, et al. *Nat Med.* 2008; 14(12):1343-50).

Ocular manifestations in SJS include conjunctivitis, subconjunctival hemorrhage, subconjunctival scarring, conjunctival membranes, conjunctival ulceration, superficial punctate epithelial erosions, epithelial defects, lid margin ulceration, lid margin keratinization, symblepharon, ankyloblepharon, trichiasis, anterior blepharitis, punctal autoocclusion, meibomian gland disease, corneal opacification, dry eye, districhiasis, limbal stem cell failure, corneal vascularization. Eye treatment in SJS consists of saline eyedrops, preservative-free artificial tears and ointments to provide adequate lubrication and reduce epithelial injury. Patients with any corneal or conjunctival epithelial defects are treated with prophylactic topical antibiotics, e.g., a fourth generation fluoroquinolone. Patients having mild or moderate ocular involvement (less than one-third lid margin involvement, conjunctival defects less than 1 cm at greatest diameter, and no corneal epithelial defects) are typically treated with topical moxifloxacin 0.5% four times a day, cyclosporine 0.05% twice daily, and topical steroids (prednisolone acetate 1% four to eight times a day or dexamethasone 0.1% twice daily). Patients having severe or extremely severe ocular involvement (greater than one-third lid margin involvement, conjunctival defects greater than 1 cm, and corneal epithelial defects) undergo an amniotic membrane (AM) grafting in addition to the treatments listed above.

In some embodiments, the subject to be treated suffers from corneal epitheliopathy. Corneal epitheliopathy is a disease involving corneal epithelium, e.g., manifested in altered corneal epithelial barrier function.

In some embodiments, the subject to be treated suffers from corneal neuropathy or corneal neuralgia. Corneal neuropathy or corneal neuralgia is a disorder associated with corneal pain caused by the damaged nerve fibers in the cornea, the sensory fibers. One of the examples of corneal neuropathy is a LASIK induced corneal neuropathy. Corneal neuropathy generally could be identified and diagnosed through dry eye investigations. Though the causes and risk factors are unclear yet, patients with dry eye-like symptoms, increased corneal sensitivity and changes of corneal nerve morphology, but no signs of dryness may suffer from corneal neuropathy.

In some embodiments, the subject to be treated suffers from ocular surface disease or disorder. The term "ocular surface diseases" or "ocular surface disorders" encompasses disease entities as well as related symptoms that result from a variety of abnormalities, including abnormal lid anatomy or function, abnormal or altered tear production or composition, and related subclinical signs. Many diseases can cause ocular surface disorders. Patients with ccular surface disorders may exhibit clinical signs common to several diseases, and include chronic punctate keratopathy, filamentary keratopathy, recurrent corneal erosion, bacterial conjunctivitis, culture-negative conjunctivitis, cicatrising (scarring) conjunctivitis, persistent epithelial defect, infectious keratitis, corneal melt and ocular surface failure. The most common ocular surface disorders stem from tear-film abnormalities and/or lid-gland dysfuntion ("blepharitis").

In some embodiments, the subject to be treated suffers from neurotrophic keratitis or neurotrophic keratopathy. Neurotrophic keratitis or neurootrophic keratopathy (NK) is a corneal degenerative disease characterized by a reduction or absence of corneal sensitivity. In NK, corneal innervation by trigeminal nerve is impaired. Since corneal sensory innervation is impaired in NK, patients do not commonly complain of ocular surface symptoms. However, blurred vision can be reported due to irregular epithelium or epithelial defects (PED), scarring, or edema. NK is usually graded in three different stages in accordance to the "Mackie classification". Stage II NK is defined by a recurrent or persistent epithelial defects, most commonly in the superior half of the cornea. One of the treatments that may be used in Stage II NK includes topical Nerve Growth Factor. Patients typically experience pain during treatment with NGF due to reforming of the nerves.

In some embodiments, the subject to be treated suffers from blepharitis. Blepharitis is an inflammatory condition of the eyelid margin, which can lead to permanent alterations in the eyelid margin or vision loss from superficial keratopathy, corneal neovascularization, and ulceration. According to anatomic location, blepharitis can be divided into anterior and posterior. Anterior blepharitis affects the eyelid skin, base of the eyelashes, and the eyelash follicles and includes the traditional classifications of staphylococcal and seborrheic blepharitis. Posterior blepharitis affects the meibomian glands and gland orifices, the primary cause being meibomian gland dysfunction. Symptoms of chronic blepharitis may include redness, burning sensation, irritation, tearing, eyelid crusting and sticking, and visual problems such as photophobia and blurred vision. Long-term management of symptoms may include daily eyelid cleansing routines and the use of therapeutic agents that reduce infection and inflammation. Treatment includes topical or systemic antibiotics e.g., bacitracin or erythromycin; oral antibiotics, e.g., tetracyclines (tetracycline, doxycycline, minocycline) or macrolides (erythromycin, azithromycin); topical steroids, e.g., corticosteroid, e.g., loteprednol etabonate, fluorometholone; topical combinations of an antibiotic and corticosteroid such as tobramycin/dexamethasone or tobramycin/loteprednol; topical cyclosporine 0.05%.

In some embodiments, the subject to be treated suffers from Meibomian gland dysfunction. The meibomian gland is a holocrine type of exocrine gland, at the rim of the eyelid inside the tarsal plate, responsible for the supply of meibum, an oily substance that prevents evaporation of the eye's tear film. Meibomian gland dysfunction (MGD), also known as meibomitis, posterior blepharitis or inflammation of the meibomian glands, is a chronic, diffuse abnormality of the meibomian glands, commonly characterized by terminal duct obstruction and/or qualitative/quantitative changes in the glandular secretion (Nelson J D, et al., *Invest Ophthalmol Vis Sci* 2011; 52:1930-7). It may result in alteration of the tear film, symptoms of eye irritation, clinically apparent inflammation, and ocular surface disease. MGD often causes dry eye, and may contribute to blepharitis. In some cases topical steroids and topical/oral antibiotics are also prescribed reduce inflammation. Intense pulsed light (IPL) treatments or other mechanical treatments that apply heat and pressure to express the glands (eg, LipiFlow) have also been shown to reduce inflammation and improve the gland function in patients.

In some embodiments, the subject to be treated suffers from graft-versus-host disease. Graft-versus-host disease (GVHD) is an inflammatory disease that is unique to allogeneic transplantation. It is an attack by transplanted leukocytes against the recipient's tissues that can occur even if the donor and recipient are HLA-identical. Acute graft-versus-host disease typically occurs in the first 3 months after transplantation and may involve the skin, intestine, or the liver. Corticosteroids such as prednisone are a standard treatment. Chronic graft-versus-host disease may also develop after allogeneic transplant and is the major source of late complications. In addition to inflammation, chronic graft-versus-host disease may lead to the development of fibrosis, or scar tissue, similar to scleroderma or other autoimmune diseases and may cause functional disability, and the need for prolonged immunosuppressive therapy.

In some embodiments, the subject to be treated suffers from ocular graft versus host disease. GVHD occurs in patients who have undergone allogenic hematological stem cell transplantation. It can occur in patients who have acute or chronic GVHD, though it is more common in patients with the chronic form. Approximately 40-90% of patients with chronic GVHD will develop ocular symptoms. Ocular manifestations can include moderate to severe keratoconjuncitvitis sicca, bilateral marginal keratitis, anterior uveitis, corneal ulceration or neovascularization. Treatment includes topical lubricants including preservative free artificial tears, autologous serum tears and other topical and systemic immunosuppressive treatments; systemic steroids; topical cyclosporine 0.5%.

EXAMPLES

The following examples are included to demonstrate non-limiting embodiments of the present invention.

General Test Conditions

X-Ray Diffraction

The X-ray powder diffraction (XRPD) patterns described herein were recorded on a Bruker D8 Advance diffractometer using CuK$_\alpha$ radiation. The XRPD pattern was recorded between 2° and 40° (2-theta).

One of ordinary skill in the art will appreciate that an X-ray diffraction pattern may be obtained with a measurement error that is dependent upon the measurement conditions employed. In particular, it is generally known that intensities in a X-ray diffraction pattern may fluctuate depending upon measurement conditions employed. It should be further understood that relative intensities may also vary depending upon experimental conditions and wavelength of X-ray radiation used. The agreement in the 2-theta-diffraction angles between specimen and reference is within 0.2° for the same crystal form and such degree of measurement error should be taken into account as pertaining to the aforementioned diffraction angles. Consequently, it is to be understood that the crystal forms of the instant invention are not limited to the crystal forms that provide X-ray diffraction patterns completely identical to the X-ray diffraction patterns depicted in the accompanying Figures disclosed herein. Any crystal forms that provide X-ray diffraction patterns substantially identical to those disclosed in the accompanying Figures fall within the scope of the present invention. The ability to ascertain substantial identities of X-ray diffraction patterns is within the purview of one of ordinary skill in the art.

Thermogravimetric Method

The TGA instruments used to test the crystalline forms was a TA Discovery TGA. Samples of 10 to 20 milligrams were analyzed at a heating rate of 10° C. per minute in the temperature range between 30° C. and about 300° C.

Differential Scanning Calorimetry (DSC)

The DSC instrument used to test the crystalline forms was a TA Discovery DSC. The DSC cell/sample chamber was purged with 20-50 ml/min of ultra-high purity nitrogen gas. The instrument was calibrated with high purity indium. The sample was placed into an open aluminum DSC pan and measured against an empty reference pan. About 1-3 mg of sample powder was placed into the bottom of the pan and lightly tapped down to make contact with the pan. The weight of the sample was measured accurately and recorded to a hundredth of a milligram. The instrument was programmed to heat at 10° C. per minute in the temperature range between 0° C. and 300° C.

Example 1. Preparation and Characterization of Crystal Form K'

Crystal form K' was obtained from a clear solution of 50 mg of compound I in 0.75 ml of n-butanol/dichloromethane (50:50v/v). As an example, 50 mg of crystal form B of compound I was used to obtain the solution of compound I. The clear solution was allowed to evaporate at ambient conditions to yield crystal form K'.

In an alternative procedure, 200 mg of compound I (e.g., crystal form B) was dissolved into 3 mL n-butanol/dichloromethane (50:50 v/v) at 25° C. The slurry was stirred for 10 minutes to obtain a clear solution. The clear solution was filtered and slowly evaporated under ambient condition for 1 hour, then some seeds of Modification K' were added and further evaporated for 6 days. The obtained suspension was filtered and dried at 30° C. under vacuum for 3 hours to yield crystal form K'.

The X-ray diffraction pattern for crystal form K' of compound I is provided as FIG. 1.

Figure 2:
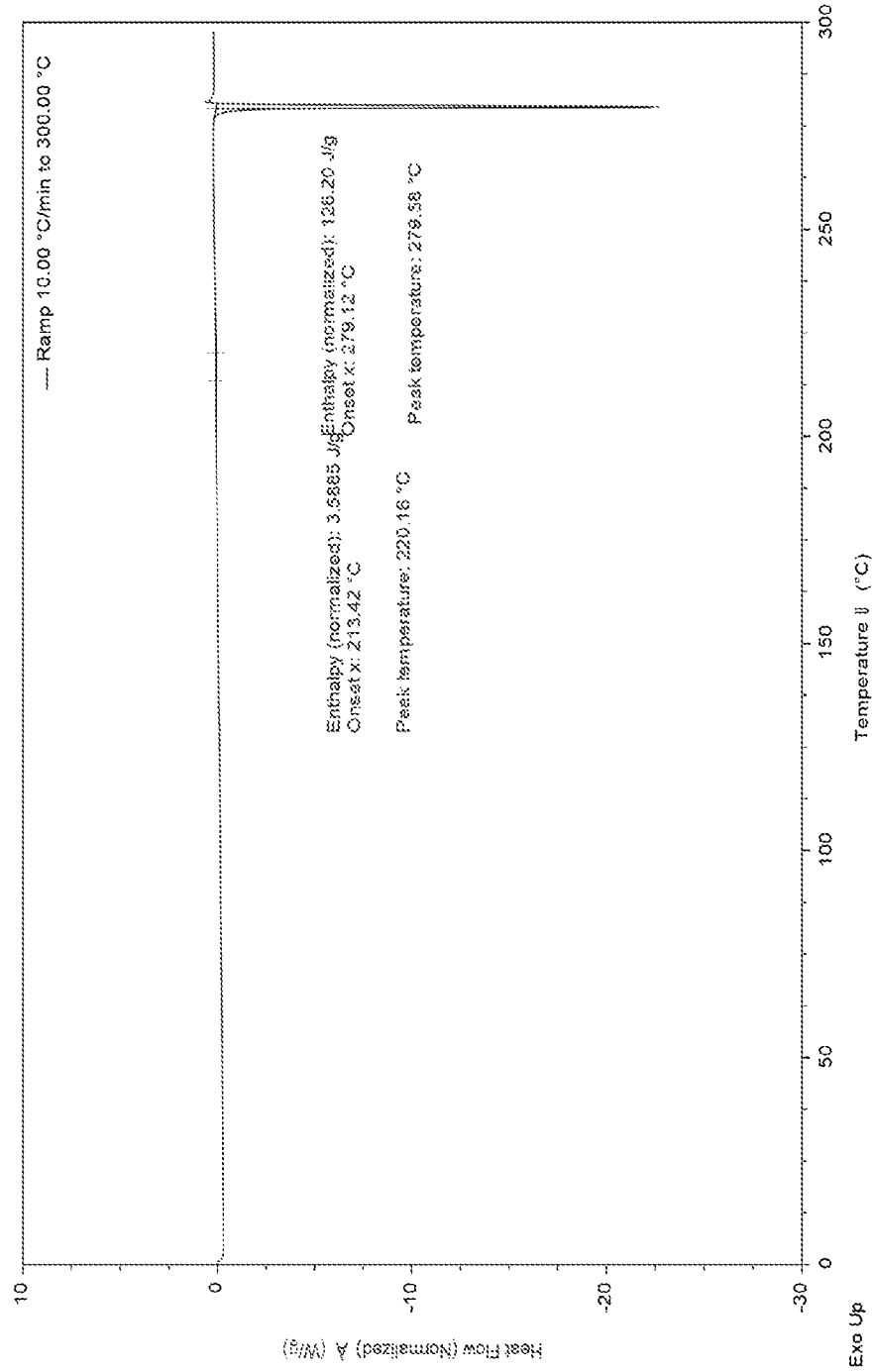
FIG. 2 provides the differential scanning calorimetry scan of crystal form K' of compound I.

Crystal form K' exhibits a final melting onset temperatures of 279° C. (FIG. 2), prior to melting other thermal events can be observed due to solid-solid transition into other crystal forms upon heating. These solid-solid transitions are not reproducible.

Crystal form K' is non-hygroscopic. It shows a maximum water uptake of less than 0.2% at 95% RH at 25° C.

Figure 3:
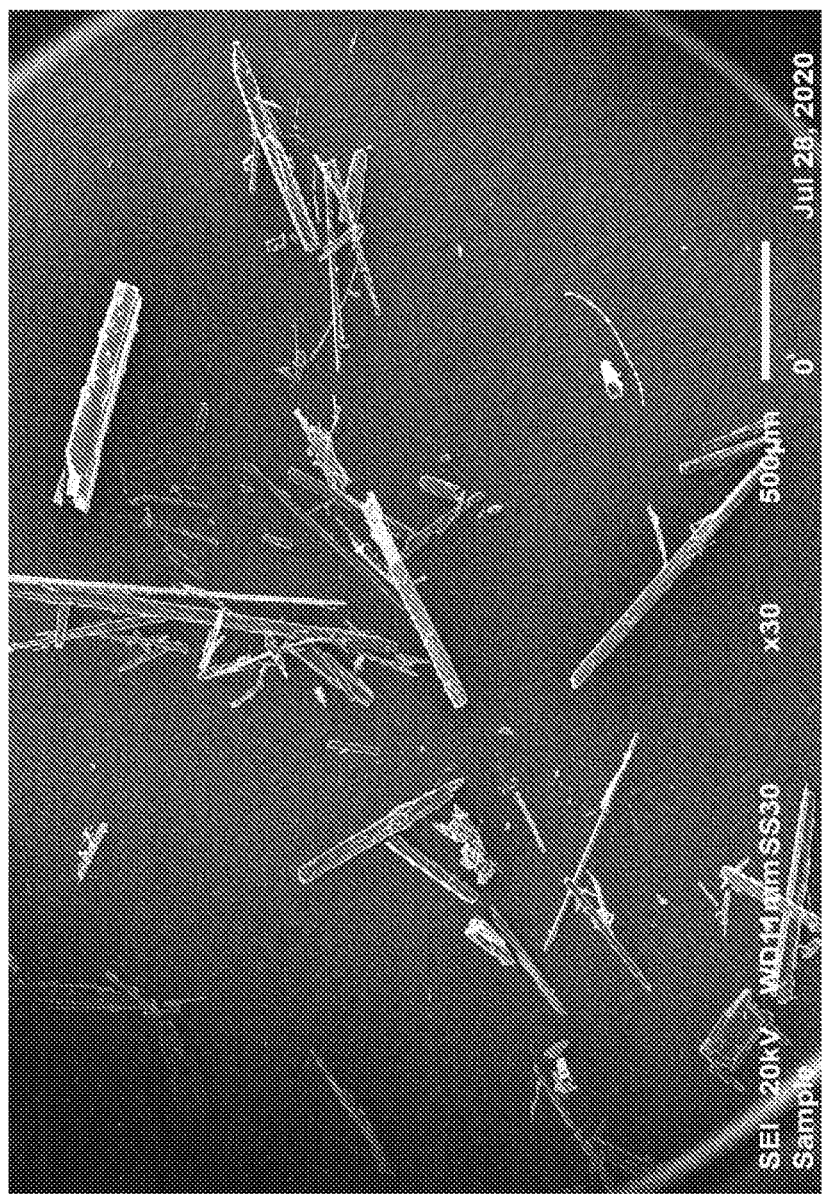
FIG. 3 provides shows the scanning electron image of crystal form K' of compound I.

FIG. 3 shows the scanning electron image of compound I crystal form K'.

TABLE 1

Powder X-Ray Diffraction Peaks compound I Crystal form K'

| Angle (2-theta) | d-spacing (Å) | Intensity (Counts) |
|---|---|---|
| 5.3 | 16.69 | 5640 |
| 10.6 | 8.36 | 2539 |
| 12.3 | 7.18 | 15775 |
| 17.0 | 5.22 | 359 |
| 17.3 | 5.12 | 418 |
| 19.4 | 4.56 | 539 |
| 20.3 | 4.36 | 611 |
| 21.2 | 4.18 | 2247 |
| 22.5 | 3.94 | 9713 |
| 23.0 | 3.87 | 1276 |
| 24.8 | 3.59 | 743 |
| 27.1 | 3.28 | 691 |
| 32.0 | 2.79 | 751 |

Example 2. Preparation and Characterization of Crystal Form M

Crystal form M was obtained by adding 1.5 g of crystal form B of compound I into 6 mL acetone, slurried with stirring at 25° C. for 1 day, add in 3 mg seeds and slurry maintained for another 3 days.

Alternatively, crystal form M may be obtained by slurrying crystal form B of compound I in acetone, ethanol, 1:1 ethanol/water, methanol or 1:1 methanol/water at 50° C. for 2 weeks.

Seeds of crystal form M were obtained by equilibration of a suspension of about 50 mg of crystal form B in 0.5 ml of 1:1 methanol/water for 2 weeks at 50° C.

Figure 4:
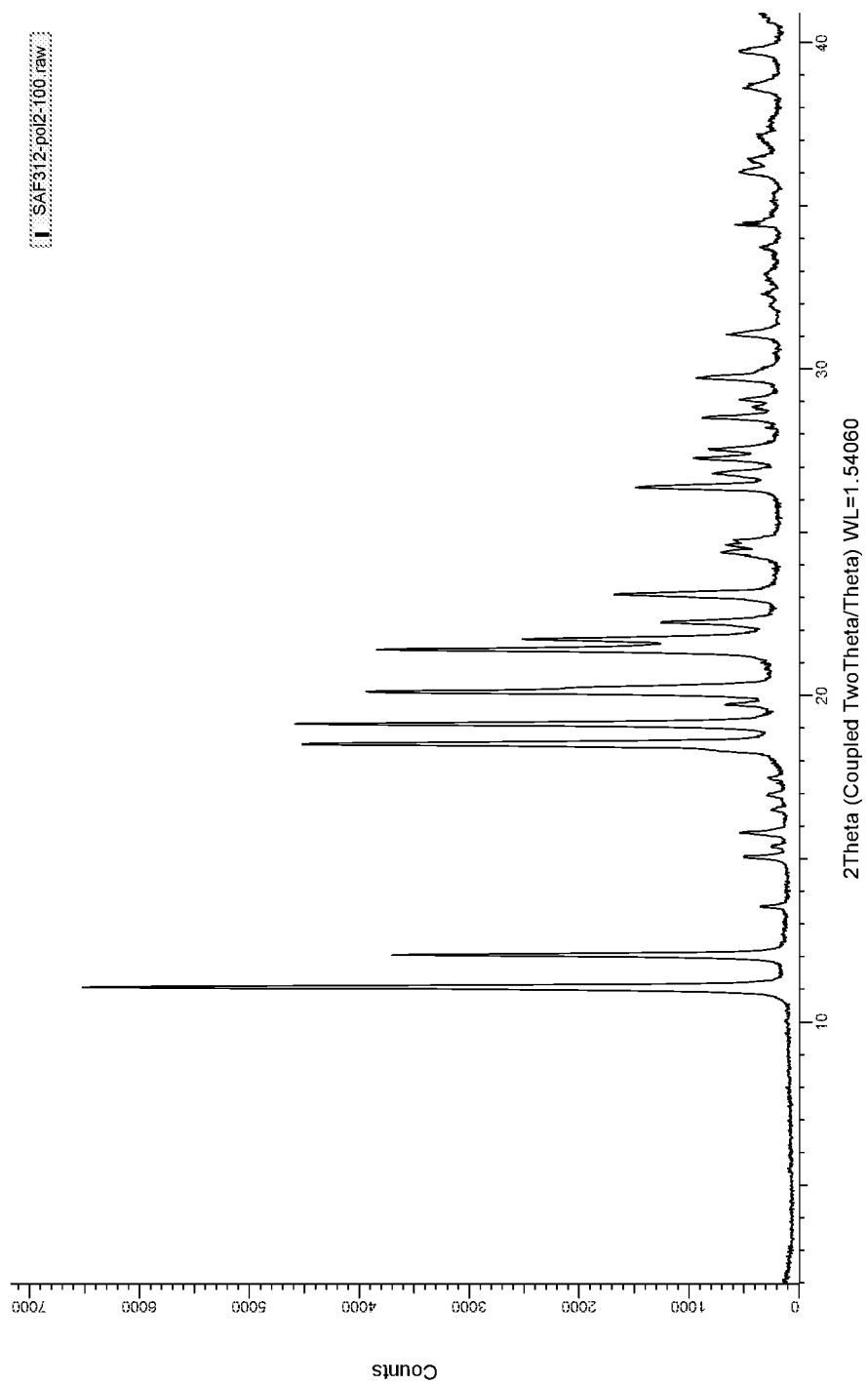
FIG. 4 provides the X-ray powder diffraction pattern of crystal form M of compound I.

The X-ray powder diffraction pattern of crystal form M is shown in FIG. 4 and the peak listing is as shown in Table 2.

TABLE 2

Powder X-Ray Diffraction Peaks Crystal form M

| Angle (2-theta) | d-spacing (Å) | Intensity (Counts) |
|---|---|---|
| 11.1 | 7.99 | 6284 |
| 12.1 | 7.33 | 3577 |
| 18.5 | 4.79 | 4310 |
| 19.1 | 4.63 | 4344 |
| 20.1 | 4.41 | 3652 |
| 21.4 | 4.14 | 3445 |
| 21.7 | 4.09 | 2166 |
| 22.2 | 3.99 | 1001 |
| 23.1 | 3.85 | 1449 |
| 26.4 | 3.37 | 1257 |
| 27.3 | 3.27 | 751 |
| 29.7 | 3.00 | 681 |

Figure 5:
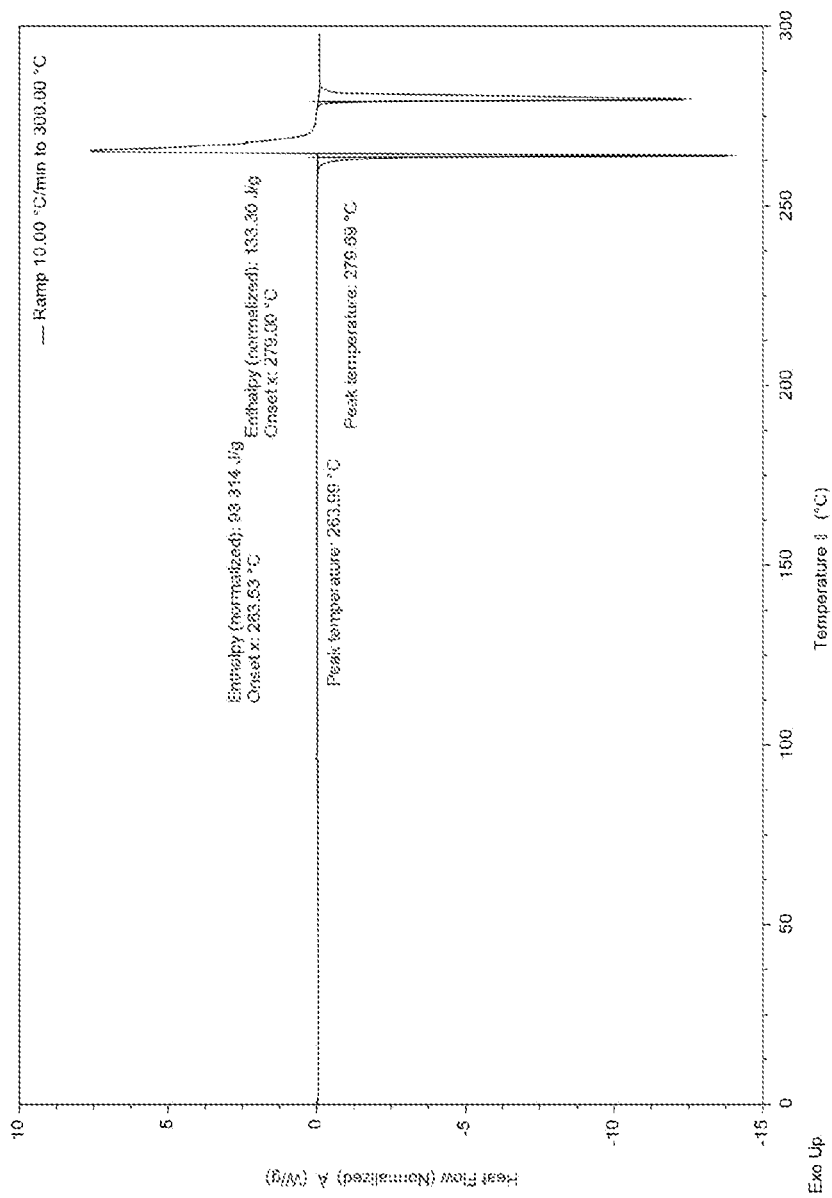
FIG. 5 provides an alternate differential scanning calorimetry scan of crystal form M of compound I.

Crystal form M shows a melting onset at 264° C. followed by recrystallization and subsequent melting at about 279° C. The DSC curve for compound I Crystal form M is shown in FIG. 5.

Crystal form M is non hygroscopic. It shows a maximum water uptake of less than 0.1% up to 95% RH at 25° C. Crystal form M was found to be thermodynamically more stable than crystal form B in the temperature range from 20° C. to 35° C.

It was found that a suspension of crystal form B and crystal form M in equimolar amounts equilibrated at 20° C., 30° C. and 35° C. in isopropylacetate, dichloromethane, ethanol or water converted after 7 days almost completely into crystal form M.

Crystal form M was found to be thermodynamically more stable than crystal form E in the temperature range from 30° C. to 45° C. It was found that a suspension of crystal form M and crystal form E in equimolar amounts equilibrated at 30° C., 35° C. and 45° C. in isopropylacetate, dichloromethane, ethanol or water converted after 7 days completely into Modification M. Crystal form E is a polymorphic form of compound I having the following peaks:

TABLE 3

Powder X-Ray Diffraction Peaks Crystal form E of compound I

| ° deg 2 θ | d-space | Relative intensity (%) |
| --- | --- | --- |
| 9.09 | 9.724 | 8 |
| 11.93 | 7.414 | 13 |
| 12.69 | 6.969 | 100 |
| 13.80 | 6.413 | 13 |
| 15.09 | 5.869 | 15 |
| 16.65 | 5.321 | 87 |
| 18.28 | 4.850 | 15 |
| 21.27 | 4.174 | 54 |
| 22.58 | 3.935 | 34 |
| 24.42 | 3.642 | 27 |
| 27.14 | 3.283 | 23 |
| 27.74 | 3.213 | 27 |
| 28.50 | 3.130 | 44 |
| 37.82 | 2.377 | 43 |

Crystal form M was found to be thermodynamically more stable than crystal form Q in the temperature range from 22° C. to 35° C.

It was found that a suspension of crystal form M and crystal form Q in equimolar amounts equilibrated at 22° C., 30° C. and 35° C. in isopropylacetate, dichloromethane, ethanol or water converted after 7 days completely into crystal form M.

The solubility of crystal form M in water at 25° C. is 0.04 mg/mL.

Figure 6:
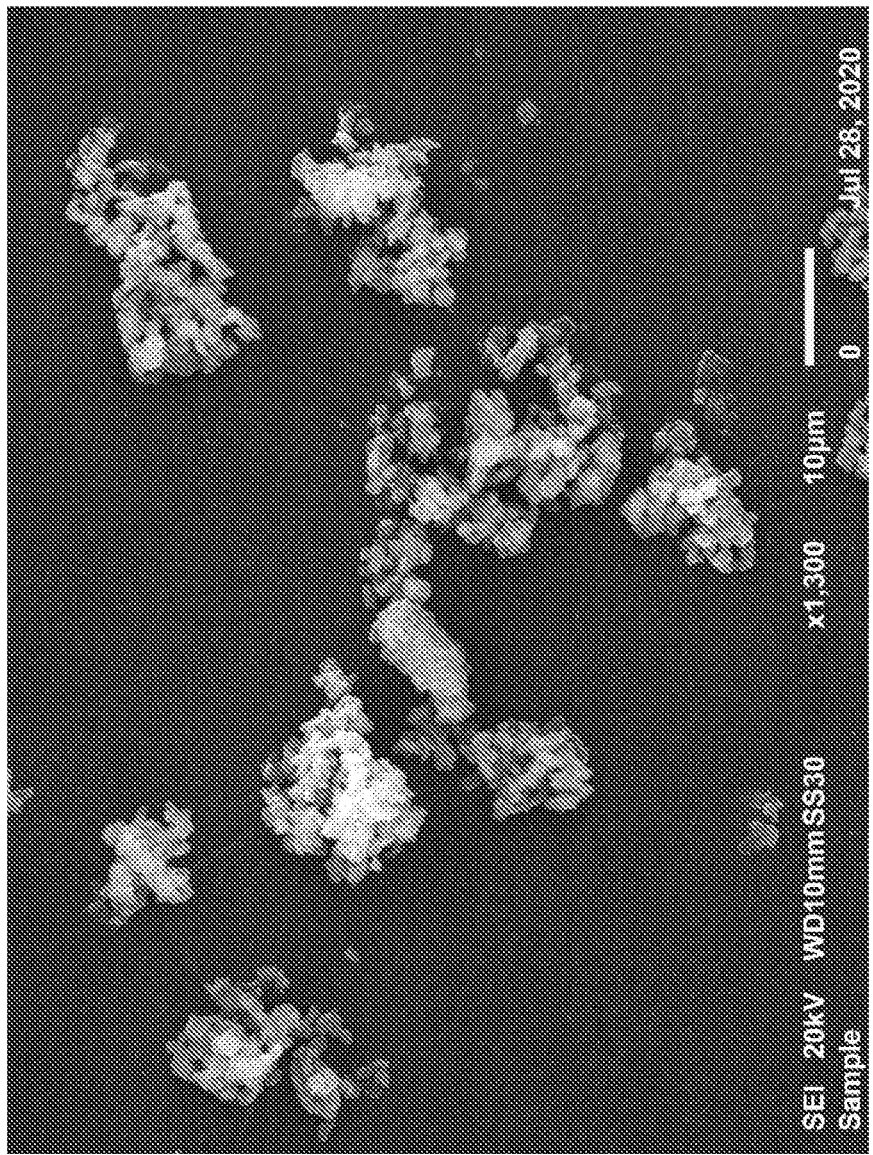
FIG. 6 provides shows the scanning electron image of crystal form M of compound I.

FIG. 6 shows the scanning electron image of compound I crystal form M.

Example 3. Preparation and Characterization of Hydrate $H_B$

Figure 7:
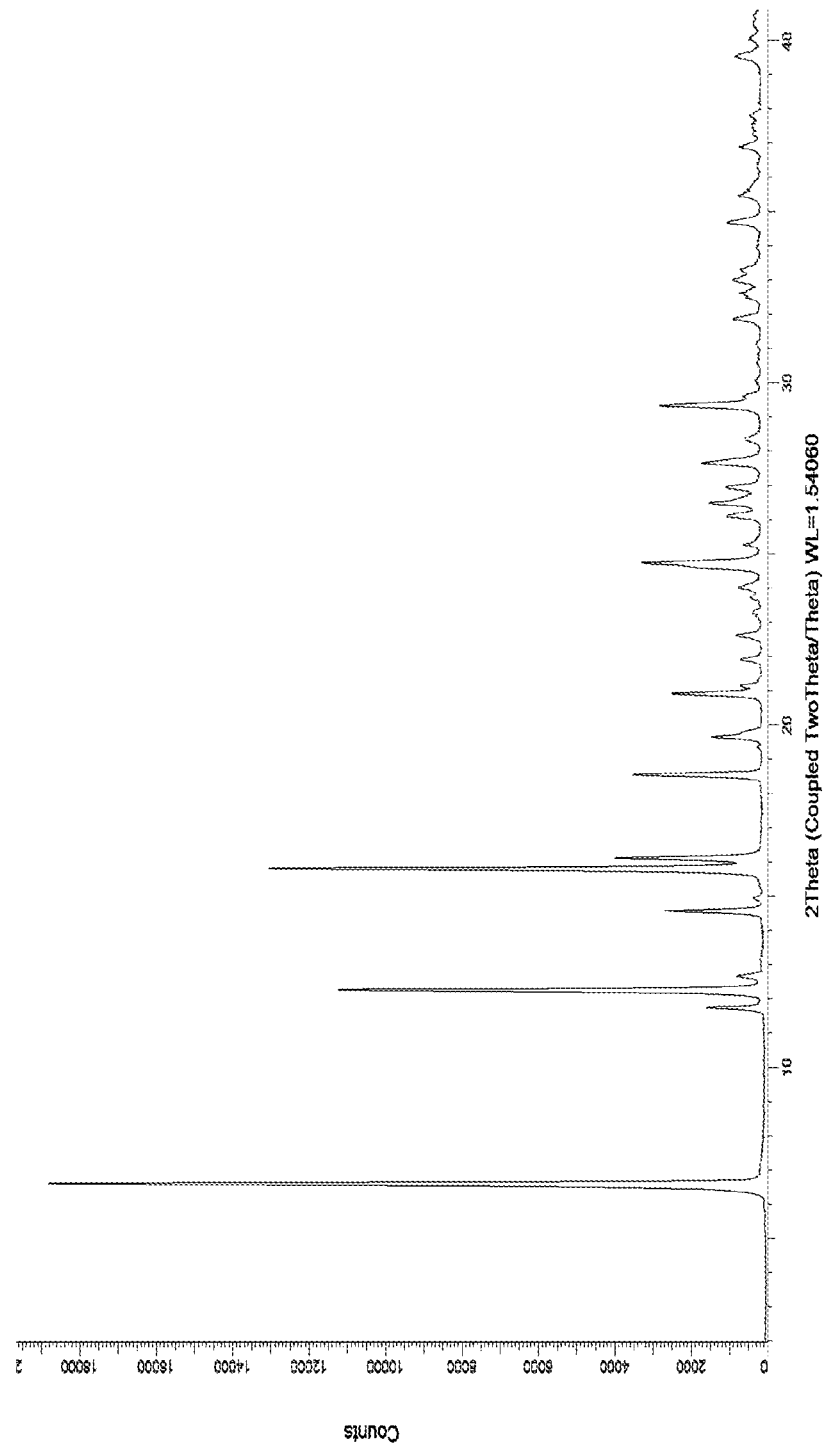
FIG. 7 provides the X-ray powder diffraction pattern of Hydrate $H_B$ of compound I.

Approximately 2.6 g of compound I in crystal form B was added into 40 mL of acetone/water (1:1 by volume) and slurried with stirring for 7 days under room temperature. The solid part was separated and spontaneously dry under ambient condition (around 40% RH) over 2-3 days to yield hydrate $H_B$. The X ray diffraction pattern of hydrate $H_B$ is shown in FIG. 7 and the peak listings are shown in Table 4.

TABLE 4

Powder X-Ray Diffraction Peaks of compound I Hydrate $H_B$

| Angle (2-theta) | d-spacing (Å) | Intensity (Counts) |
| --- | --- | --- |
| 6.6 | 13.42 | 17902 |
| 11.7 | 7.54 | 1477 |
| 12.2 | 7.22 | 10900 |
| 14.6 | 6.08 | 2452 |
| 15.8 | 5.61 | 12827 |

TABLE 4-continued

Powder X-Ray Diffraction Peaks of compound I Hydrate $H_B$

| Angle (2-theta) | d-spacing (Å) | Intensity (Counts) |
| --- | --- | --- |
| 16.1 | 5.50 | 2820 |
| 18.5 | 4.78 | 3354 |
| 19.7 | 4.51 | 1269 |
| 20.9 | 4.24 | 2338 |
| 24.7 | 3.60 | 2955 |
| 26.5 | 3.36 | 1263 |
| 27.7 | 3.22 | 1403 |
| 29.3 | 3.04 | 2587 |

Figure 8:
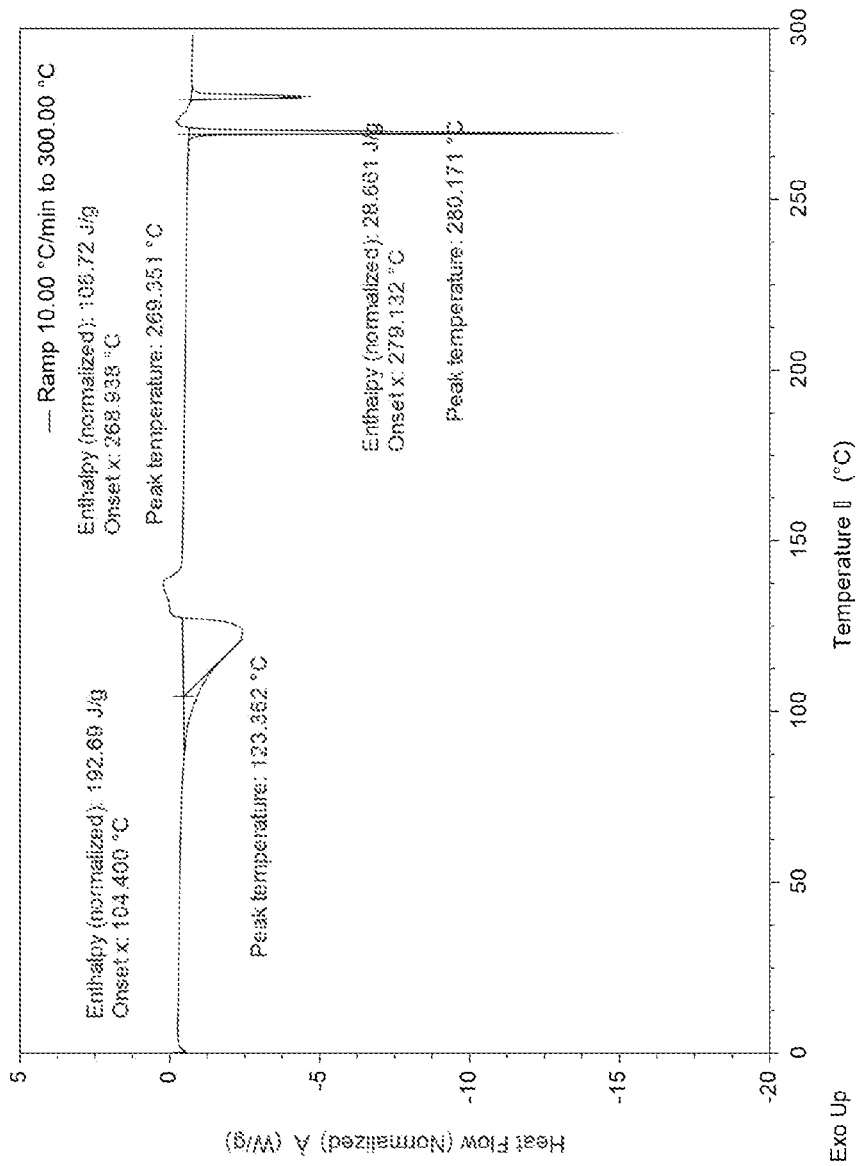
FIG. 8 provides an alternate differential scanning calorimetry scan of crystal form M of compound I.
Figure 9:
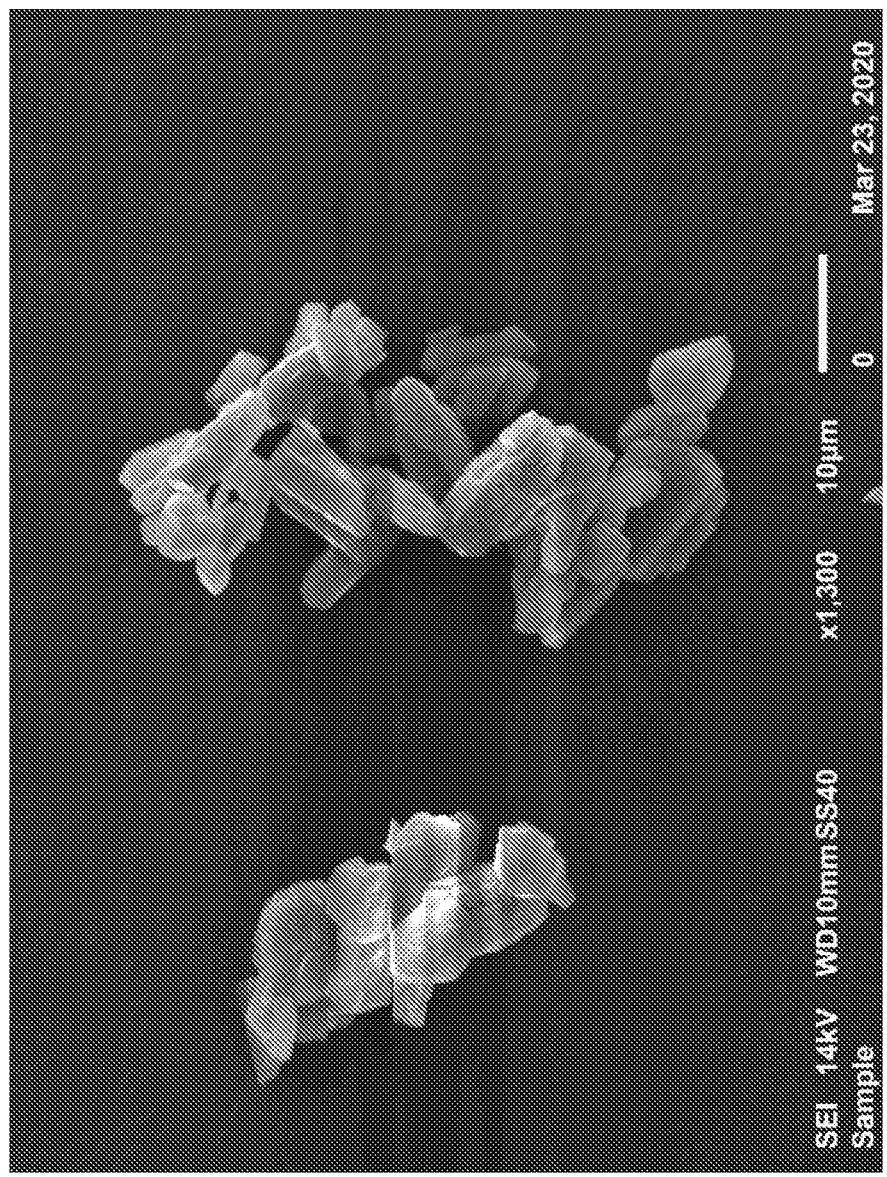
FIG. 9 provides shows the scanning electron image of Hydrate $H_B$ of compound I.

Upon heating in a DSC, hydrate $H_B$ starts to dehydrate at about 104° C. When exposed to moisture it shows a slight uptake of water up to 70% RH at 25° C., above 70% RH Hydrate $H_B$ can take up additionally about 2.5% of water at 95% RH. The DSC curve of compound I Hydrate $H_B$ is shown in FIG. 8 and the SEM image is shown in FIG. 9.

Example 4. Preparation and Characterization of Crystal Form Q 1 g of compound I (crystal form B) was added into 3 mL of n-Butanol/DCM (1:1 by volume) and slurried with stir bar under 50° C. for 1 day, add in 90 mg seeds and slurried for another 3 days.

Seeds of crystal form Q were obtained by equilibration of a suspension of 500 mg of crystal form Mod B in 2 ml of n-butanol/dichloromethane (50:50, v/v) for 5 days at 50° C.

Figure 10:
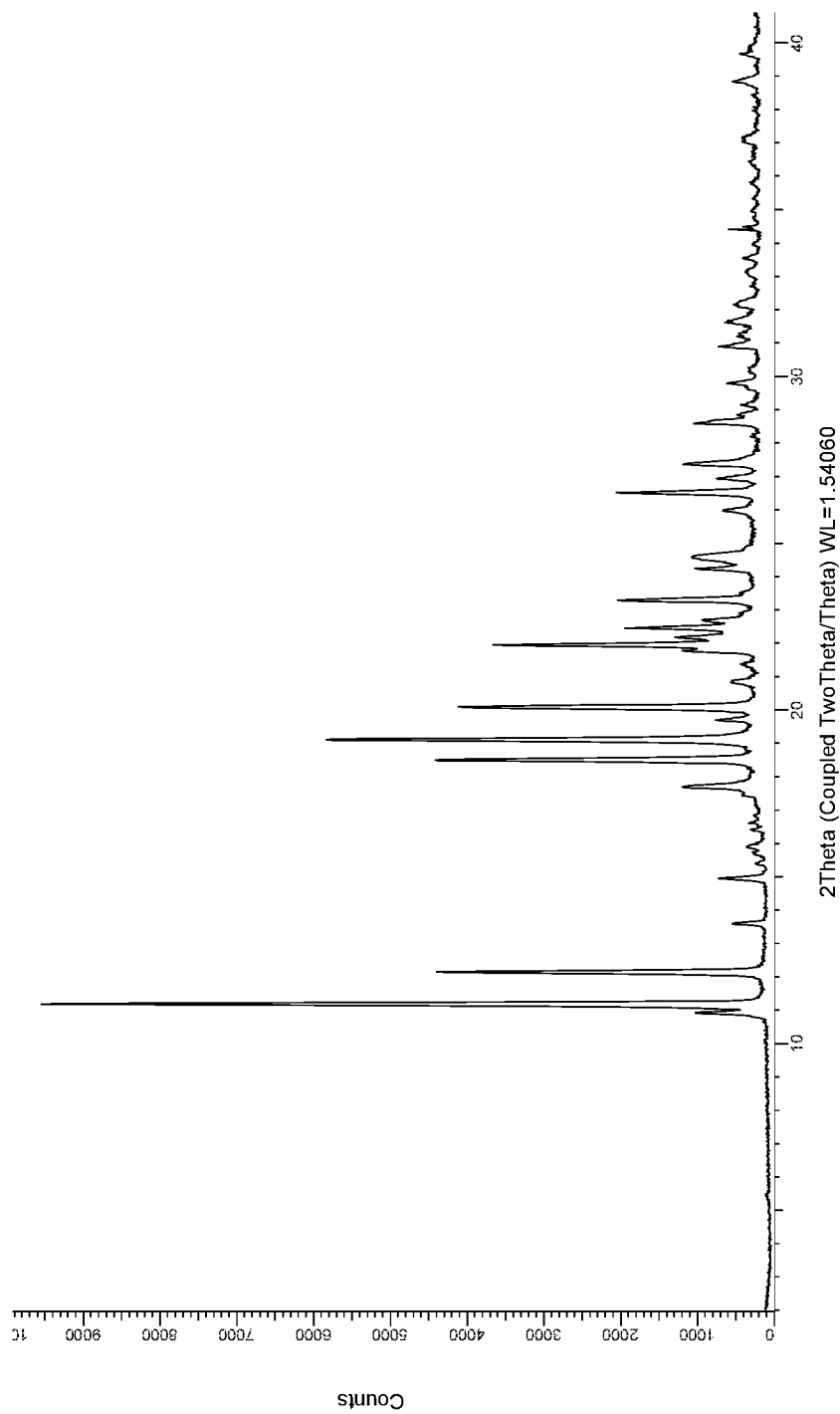
FIG. 10 provides the X-ray powder diffraction pattern of crystal form Q of compound I.

The X-ray powder diffraction pattern of crystal form Q is shown in FIG. 10 and the peak listing is as shown in Table 55.

TABLE 5

Powder X-Ray Diffraction Peaks compound I Crystal form Q

| Angle (2-theta) | d-spacing (Å) | Intensity (Counts) |
| --- | --- | --- |
| 11.2 | 7.90 | 9278 |
| 12.2 | 7.28 | 4215 |
| 17.7 | 5.00 | 949 |
| 18.5 | 4.79 | 4157 |
| 19.1 | 4.64 | 5545 |
| 20.1 | 4.42 | 3813 |
| 22.0 | 4.05 | 3342 |
| 22.5 | 3.95 | 1564 |
| 23.3 | 3.81 | 1697 |
| 24.2 | 3.67 | 724 |
| 24.6 | 3.62 | 779 |
| 26.5 | 3.36 | 1761 |
| 28.6 | 3.11 | 711 |

Figure 11:
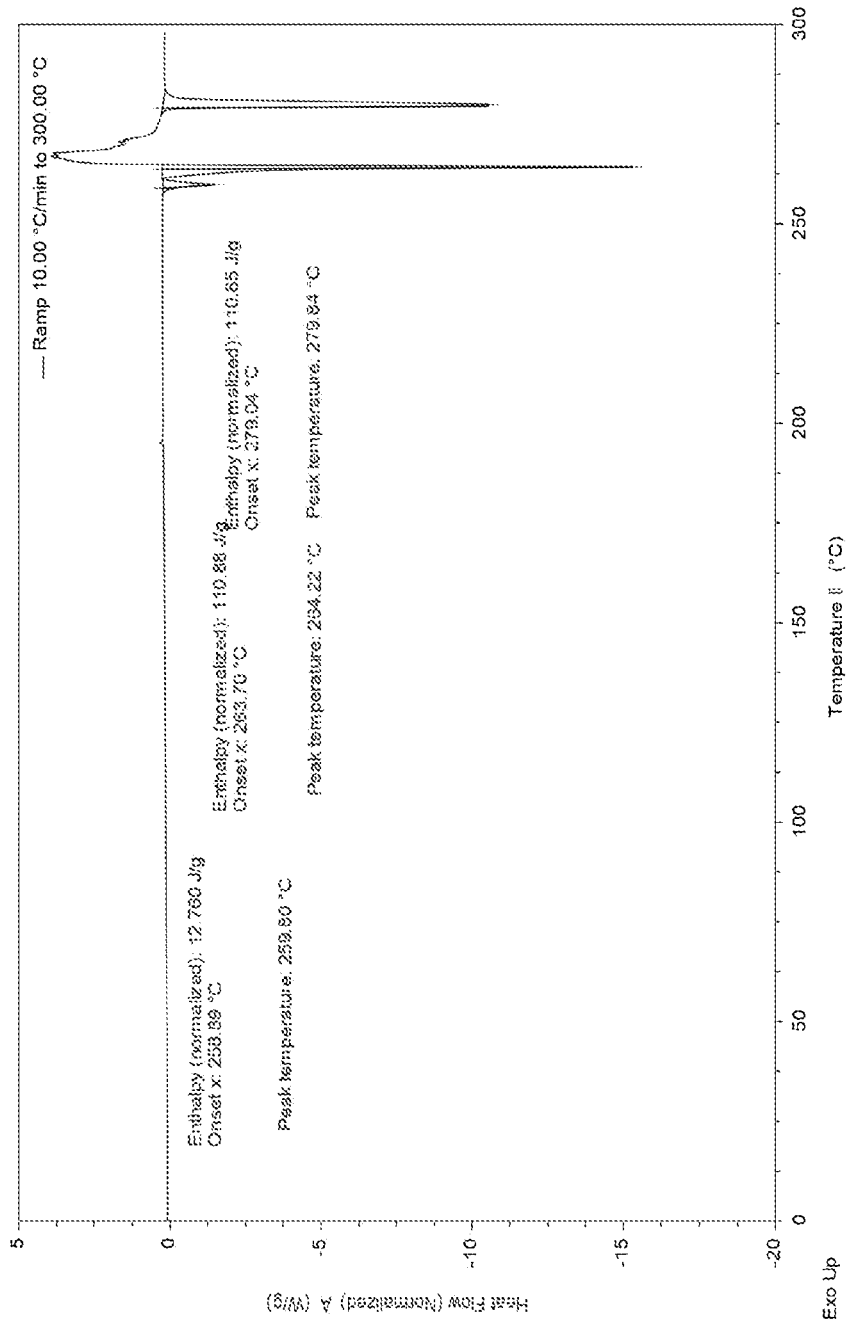
FIG. 11 provides an alternate differential scanning calorimetry scan of crystal form Q of compound I.
Figure 12:
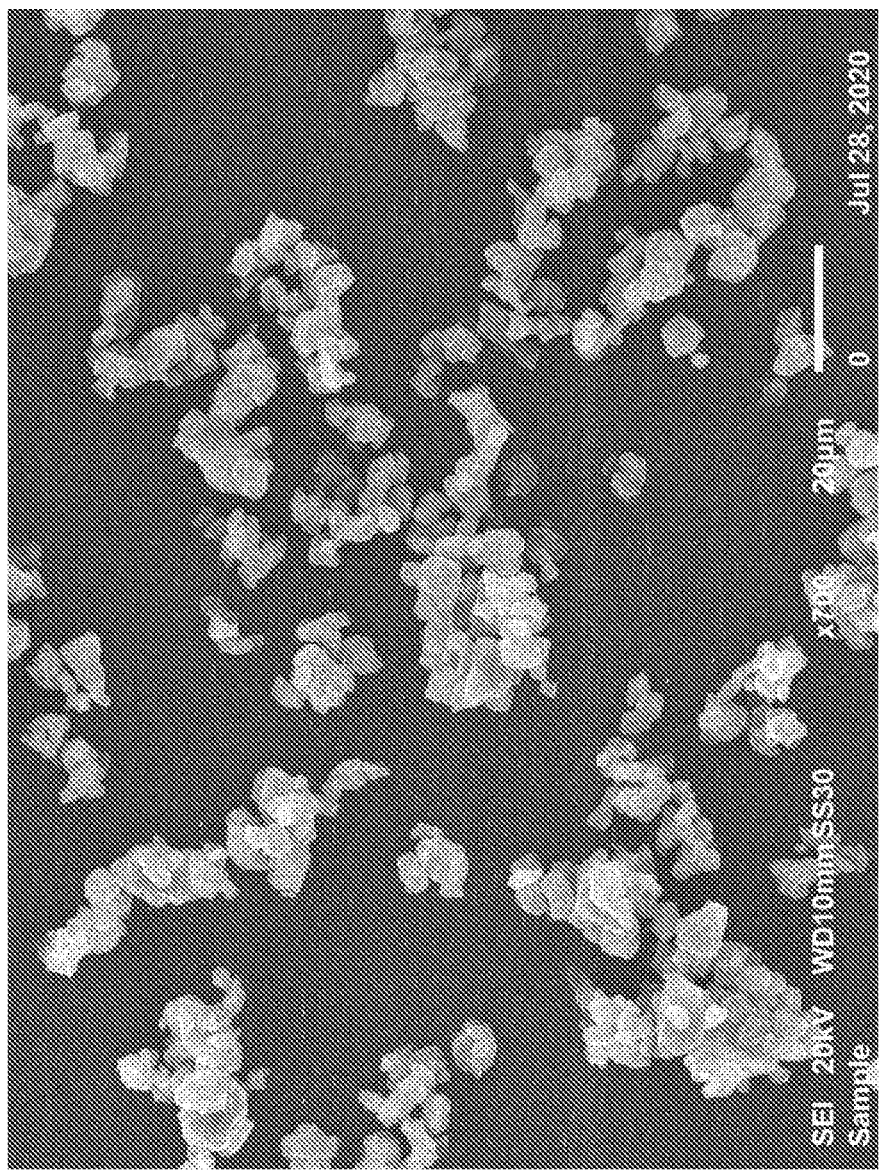
FIG. 12 provides shows the scanning electron image of crystal form Q of compound I.

Crystal form Q exhibits a melting onset at 259° C. followed by recrystallization and subsequent melting at about 263.7° C. and 279.0° C. The DSC curve for compound I crystal form Q is shown in FIG. 11 and an SEM image is shown in FIG. 12.

Crystal form Q is non hygroscopic. It shows a maximum water uptake of less than 0.1% up to 95% RH at 25° C.

All publications and patent documents cited herein are incorporated herein by reference as if each such publication or document was specifically and individually indicated to be incorporated herein by reference. The present invention and its embodiments have been described in detail. However, the scope of the present invention is not intended to be limited to the particular embodiments of any process, manufacture, composition of matter, compounds, means, methods, and/or steps described in the specification. Various modifications, substitutions, and variations can be made to the disclosed material without departing from the spirit and/or essential characteristics of the present invention. Accordingly, one of ordinary skill in the art will readily appreciate from the invention that later modifications, substitutions, and/or variations performing substantially the same function or achieving substantially the same result as embodiments described herein may be utilized according to such related embodiments of the present invention. Thus, the following claims are intended to encompass within their scope modifications, substitutions, and variations to processes, manufactures, compositions of matter, compounds, means, methods, and/or steps disclosed herein. The claims should not be read as limited to the described order or elements unless stated to that effect. It should be understood that various changes in form and detail may be made without departing from the scope of the appended claims.

What is claimed is:

1. A crystal form of 4-(7-Hydroxy-2-isopropyl-4-oxo-4H-quinazolin-3-yl)-benzonitrile (compound I) having structure

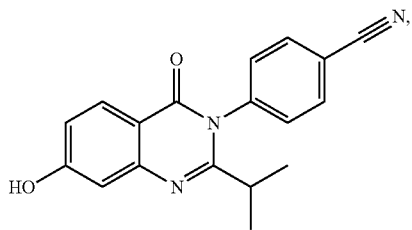 [SMILES: CC(C)c1nc2cc(O)ccc2c(=O)n1-c1ccc(C#N)cc1]

or a hydrate thereof,
wherein the crystal form is selected from form K', form M, form $H_B$, and form Q.

2. The crystal form of claim 1, wherein the form is form K' of compound I, characterized by an X ray diffraction pattern having three or more peaks at 2θ values selected from 5.3, 12.3, and 22.5, ±0.2 °2θ.

3. The crystal form of claim 1, wherein the form is form K' of compound I, characterized by an X ray diffraction pattern having three or more peaks at 2θ values selected from 5.3, 10.6, 12.3, 21.2, 22.5, and 23.0, ±0.2 °2θ.

4. A method of preparing a crystal form K' of compound I of claim 2, comprising evaporating a solution of compound I in about 1:1 (v/v) n-butanol/dichloromethane, to crystallize compound I as crystal form K'.

5. The crystal form of claim 1, wherein the form is form M of compound I, characterized by an X ray diffraction pattern having three or more peaks at 2θ values selected from 11.1, 18.5, and 19.1, ±0.2 °2θ.

6. The crystal form of claim 1, wherein the form is form M of compound I, characterized by an X ray diffraction pattern having three or more peaks at 2θ values selected from 11.1, 12.1, 18.5, 19.1, 20.1, and 21.4, ±0.2 °2θ.

7. A method of preparing a crystal form M of compound I of claim 5, comprising slurrying compound I crystal form B in acetone at room temperature for at least 24 hours, to provide crystal form M.

8. The crystal form of claim 1, wherein the form is form $H_B$ of the hydrate of compound I, characterized by an X ray diffraction pattern having three or more peaks at 2θ values selected from 6.6, 12.2, and 15.8, ±0.2 °2θ.

9. The crystal form of claim 1, wherein the form is form $H_B$ of the hydrate of compound I, characterized by an X ray diffraction pattern having three or more peaks at 2θ values selected from 6.6, 12.2, 14.6, 15.8, 16.1, 18.5, 20.9, and 24.7, ±0.2 °2θ.

10. A method of preparing crystal form $H_B$ of the hydrate of compound I of claim 8, comprising slurrying compound I crystal form B in an about 1:1 mixture of acetone and water at room temperature for at least 5 days, at least 6 days, or at least 7 days, to provide crystal form $H_B$.

11. The crystal form of claim 1, wherein the form is form Q of compound I, characterized by an X ray diffraction pattern having three or more peaks at 2θ values selected from 11.2, 12.2, and 19.1, ±0.2 °2θ.

12. The crystal form of claim 1, wherein the form is form Q of compound I, characterized by an X ray diffraction pattern having three or more peaks at 2θ values selected from 11.2, 12.2, 18.5, 19.1, 20.1, 22.0, 22.5, 23.3, and 26.5, ±0.2 °2θ.

13. A method of preparing crystal form Q of compound I of claim 11, comprising slurrying compound I crystal form B in about 1:1 (v/v) n-butanol/dichloromethane, to obtain crystal form Q.

14. A pharmaceutical formulation, comprising one or more crystal forms of claim 1 and a pharmaceutically acceptable excipient.

15. An aqueous formulation comprising
one or more crystal forms of 4-(7-Hydroxy-2-isopropyl-4-oxo-4H-quinazolin-3-yl)-benzonitrile (compound I) having structure

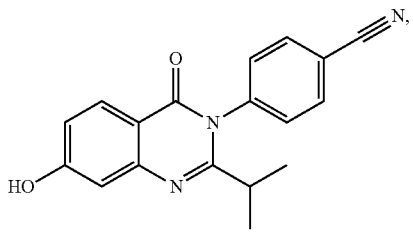 [SMILES: CC(C)c1nc2cc(O)ccc2c(=O)n1-c1ccc(C#N)cc1]

or a hydrate thereof,
wherein the crystal form is selected from form K', form M, form $H_B$, and form Q, in an amount of about 0.5% w/v to about 3.5% w/v, present as a suspension in the formulation;
a non-ionic surfactant;
a suspending agent;
a tonicity agent;
a buffer;
a salt; and
optionally, a preservative.

16. The aqueous formulation of claim 15, wherein the non-ionic surfactant is selected from the group consisting of a polysorbate surfactant, a block copolymer of ethylene oxide/propylene oxide surfactant, poloxamer, tyloxapol, and combinations thereof; or
wherein the suspending agent is carbomer, present in the formulation in an amount of at least about 0.05% w/v, at least about 0.1% w/v, or at least about 0.2% w/v, and no greater than about 1.0% w/v, no greater than about 0.6% w/v, or no greater than about 0.5% w/v; or
wherein the suspending agent is hydroxypropyl methyl cellulose present in the formulation in an amount of at least about 0.05% w/v, at least about 0.1% w/v, or at least about 0.25% w/v, and less than about 1.8% w/v, less than about 1.0% w/v, less than about 0.8% w/v, or less than about 0.6% w/v; or wherein the suspending agent is a polyethylene glycol (PEG) having molecular weight of from about 200 to about 20,000 Da.

17. The aqueous formulation of claim 15, wherein the tonicity agent is selected from the group consisting of polyols, or wherein the buffer is selected from the group consisting of acetate, ascorbate, borate, hydrogen carbonate, carbonate, citrate, edetate (EDTA) gluconate, lactate, phosphate, propionate and TRIS (tromethamine).

18. The aqueous formulation of claim 15, wherein the pH of the formulation is about 5.5 to about 8.0.

19. A method of treating or reducing ocular surface pain in a subject in need thereof, comprising ocularly administering an effective amount of a crystal form of claim 1 to the subject.

20. A method of treating or reducing ocular surface pain in a subject in need thereof, comprising ocularly administering an effective amount of an aqueous formulation of claim 15.

* * * * *